US012101034B2

(12) United States Patent
Kato et al.

(10) Patent No.: US 12,101,034 B2
(45) Date of Patent: Sep. 24, 2024

(54) POWER CONVERTER APPARATUS CONVERTING INPUT POWER HAVING A PREDETERMINED VOLTAGE INTO OUTPUT POWER HAVING A PREDETERMINED OUTPUT VOLTAGE OVER WIDE RANGE WITH HIGHER EFFICIENCY

(71) Applicant: Panasonic Intellectual Property Management Co., Ltd., Osaka (JP)

(72) Inventors: Akira Kato, Osaka (JP); Motohiko Fujimura, Kanagawa (JP); Kazuyuki Sakiyama, Osaka (JP); Takehiko Yamakawa, Osaka (JP); Taiki Nishimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 343 days.

(21) Appl. No.: 17/441,184

(22) PCT Filed: Feb. 14, 2020

(86) PCT No.: PCT/JP2020/005801
§ 371 (c)(1),
(2) Date: Sep. 20, 2021

(87) PCT Pub. No.: WO2020/195305
PCT Pub. Date: Oct. 1, 2020

(65) Prior Publication Data
US 2022/0166329 A1 May 26, 2022

(30) Foreign Application Priority Data
Mar. 28, 2019 (JP) ................... 2019-064603

(51) Int. Cl.
*H02M 3/335* (2006.01)
*H02M 1/00* (2007.01)
*H02M 3/00* (2006.01)

(52) U.S. Cl.
CPC ...... *H02M 3/33573* (2021.05); *H02M 1/0064* (2021.05); *H02M 3/003* (2021.05); *H02M 3/015* (2021.05)

(58) Field of Classification Search
CPC .... G05F 1/14; G05F 1/10; G05F 1/66; H02M 3/33507; H02M 3/33573; H02M 3/01;
(Continued)

(56) References Cited

U.S. PATENT DOCUMENTS 9,246,356 B2    1/2016  Baarman
9,742,298 B2 *  8/2017  Chueh ............... H02M 3/33576
(Continued)

FOREIGN PATENT DOCUMENTS

CN    204733095 U    10/2015
CN    205081686 U     3/2016
(Continued)

OTHER PUBLICATIONS

International Search Report issued in International Patent Application No. PCT/JP2020/005801, dated Apr. 28, 2020; with English translation.
(Continued)

*Primary Examiner* — Gustavo A Rosario-Benitez
(74) *Attorney, Agent, or Firm* — Rimon P.C.

(57) ABSTRACT

A power conversion device is equipped with at least one leg circuit containing two switching elements connected in series, respectively, a transformer having a primary winding and a secondary winding, a capacitor connected between the leg circuit and one end of the primary winding, a switch circuit, and a rectifier circuit. The switch circuit selectively
(Continued)

connects one of a plurality of winding sections of the secondary winding that are different from each other to the rectifier circuit.

8 Claims, 17 Drawing Sheets

(58) Field of Classification Search
CPC ......... H02M 3/33584; H02M 3/33546; H02M 3/33571; H02M 3/33523; H02M 3/33569; H02M 1/14; H02M 1/42; H02M 1/0064
See application file for complete search history.

(56) References Cited

U.S. PATENT DOCUMENTS

| | | | | |
|---|---|---|---|---|
| 9,825,544 | B2* | 11/2017 | Marrero | H02M 3/33507 |
| 2006/0018134 | A1* | 1/2006 | Tsuruya | H01F 38/08 |
| | | | | 363/21.04 |
| 2008/0212341 | A1* | 9/2008 | Moiseev | H01F 3/14 |
| | | | | 363/21.04 |
| 2014/0153290 | A1 | 6/2014 | Li et al. | |
| 2015/0295504 | A1* | 10/2015 | Tanahashi | H02M 3/33584 |
| | | | | 307/24 |
| 2016/0049879 | A1* | 2/2016 | Park | H05B 45/382 |
| | | | | 363/21.1 |
| 2017/0054378 | A1* | 2/2017 | Njiende T. | H01F 30/04 |
| 2017/0358994 | A1* | 12/2017 | Ueno | H02M 3/33592 |
| 2018/0309375 | A1 | 10/2018 | Luccato et al. | |
| 2020/0274452 | A1* | 8/2020 | Hergt | H02M 3/01 |
| 2020/0294708 | A1* | 9/2020 | Ishizawa | H05K 1/165 |
| 2020/0306890 | A1* | 10/2020 | Gharib | B23K 28/02 |
| 2021/0287849 | A1* | 9/2021 | Kawaguchi | H02M 3/33569 |

FOREIGN PATENT DOCUMENTS

| | | |
|---|---|---|
| CN | 105915066 A | 8/2016 |
| CN | 106130356 A | 11/2016 |
| CN | 206452300 U | 8/2017 |
| CN | 107967986 A | 4/2018 |
| CN | 207354059 U | 5/2018 |
| CN | 207926446 U | 9/2018 |
| CN | 108736733 A | 11/2018 |
| CN | 109327143 A | 2/2019 |
| EP | 3 361 616 A1 | 8/2018 |
| JP | S55-51636 U | 4/1980 |
| JP | 2010-110069 A | 5/2010 |
| JP | 2012-085447 A | 4/2012 |
| JP | 5911591 B | 4/2016 |
| KR | 101533567 B1 | 7/2015 |

OTHER PUBLICATIONS

Chinese Office Action dated Sep. 19, 2023 issued in the corresponding Chinese Patent Application No. 202080024431.5, with English translation of Search Report and Office Action.

English translation of the International Preliminary Report on Patentability issued in International Application No. PCT/JP2020/005801, mailed Oct. 7, 2021.

Chinese Office Action dated Mar. 1, 2024 issued in the corresponding Chinese Patent Application No. 202080024431.5, with English machine translation.

* cited by examiner

POWER CONVERTER APPARATUS CONVERTING INPUT POWER HAVING A PREDETERMINED VOLTAGE INTO OUTPUT POWER HAVING A PREDETERMINED OUTPUT VOLTAGE OVER WIDE RANGE WITH HIGHER EFFICIENCY

CROSS-REFERENCE OF RELATED APPLICATIONS

This application is the U.S. National Phase under 35 U.S.C. § 371 of International Patent Application No. PCT/JP2020/005801, filed on Feb. 14, 2020, which in turn claims the benefit of Japanese Application No. 2019-064603, filed on Mar. 28, 2019, the entire disclosures of which Applications are incorporated by reference herein.

TECHNICAL FIELD

The present disclosure relates to a power converter apparatus that converts an input power having a predetermined voltage, into an output power having a predetermined voltage.

BACKGROUND ART

In order to output a predetermined voltage from an AC power supply voltage changing sinusoidally, a power supply is proposed in Patent Document 1, for example. According to Patent Document 1, windings in the primary winding to which the AC power supply voltage is applied is switched over twice or more times within one cycle of the AC power supply voltage by controlling switching elements, in response to respective voltages at timings within one cycle thereof. In this case, the turn ratio of the primary winding to the secondary winding of the transformer is increased at the timings when the AC power supply voltage is low, and the turn ratio of the primary winding to the secondary winding of the transformer is decreased at the timings when the AC power supply voltage is high. The primary winding is configured to include a plurality of windings having different numbers of turns, making the turn ratio of the transformer freely switchable depending on combinations of the plurality of windings.

In addition, in order to improve the efficiency of the power converter apparatus that converts an input power having a predetermined voltage into an output power having a predetermined voltage, an LLC resonant power converter apparatus is proposed that includes a plurality of switching elements, a transformer including leakage inductance inside thereof, and a capacitor. The primary winding of the transformer, the leakage inductance of the transformer, and the capacitor configure the LLC resonance circuit. The LLC resonant power converter apparatus can change the output voltage by changing the switching frequency of the switching elements. Generally speaking, the output voltage increases as the switching frequency decreases, and the output voltage decreases as the switching frequency increases.

PRIOR ART DOCUMENT

Patent Document

[Patent Document 1] Japanese Patent No. JP5911591B

SUMMARY OF THE INVENTION

Problems to be Solved by the Invention

In the LLC resonant power converter apparatus, the characteristic of the output voltage to the switching frequency changes depending on the leakage inductance of the transformer. In the case of the same switching frequency, the larger the leakage inductance of the transformer is, the smaller the output voltage is.

In the LLC resonant power converter apparatus, we consider the case that the technique of switching the turn ratio of the primary winding to the secondary winding of the transformer is applied, as described in Patent Document 1. For example, in order to decrease the secondary output voltage, the windings are switched over to increase the turn ratio of the primary winding to the secondary winding of the transformer. If the leakage inductance of the transformer decreases in response to such switching over of the windings, the advantageous effect expectable from the increase of turn ratio will unfortunately be canceled by the influence of the decreased leakage inductance. Therefore, this makes it difficult to generate the output voltage over a wide voltage range without reducing the efficiency.

An object of the present disclosure is to provide an LLC resonant power converter apparatus capable of generating the output voltage over a wide voltage range with higher efficiency than that of the prior art.

Means for Dissolving Problems

According to one aspect of the present disclosure, there is provided a power converter apparatus including:
  first and second input terminals;
  first and second output terminals;
  at least one first leg circuit including two switching elements connected in series between the first and the second input terminals;
  a transformer having a primary winding and a secondary winding;
  a capacitor;
  a switch circuit; and
  an output circuit connected to the first and the second output terminals.

The capacitor is connected between one of the at least one first leg circuit and one end of the primary winding, and the switch circuit selectively connects one of a plurality of mutually different winding sections of the secondary winding to the output circuit.

Effect of the Invention

The power converter apparatus according to one aspect of the present disclosure is an LLC resonant power converter apparatus, and can generate output voltage over a wide voltage range with higher efficiency than that of the prior art.

MODE FOR CARRYING OUT THE INVENTION

Figure 1:
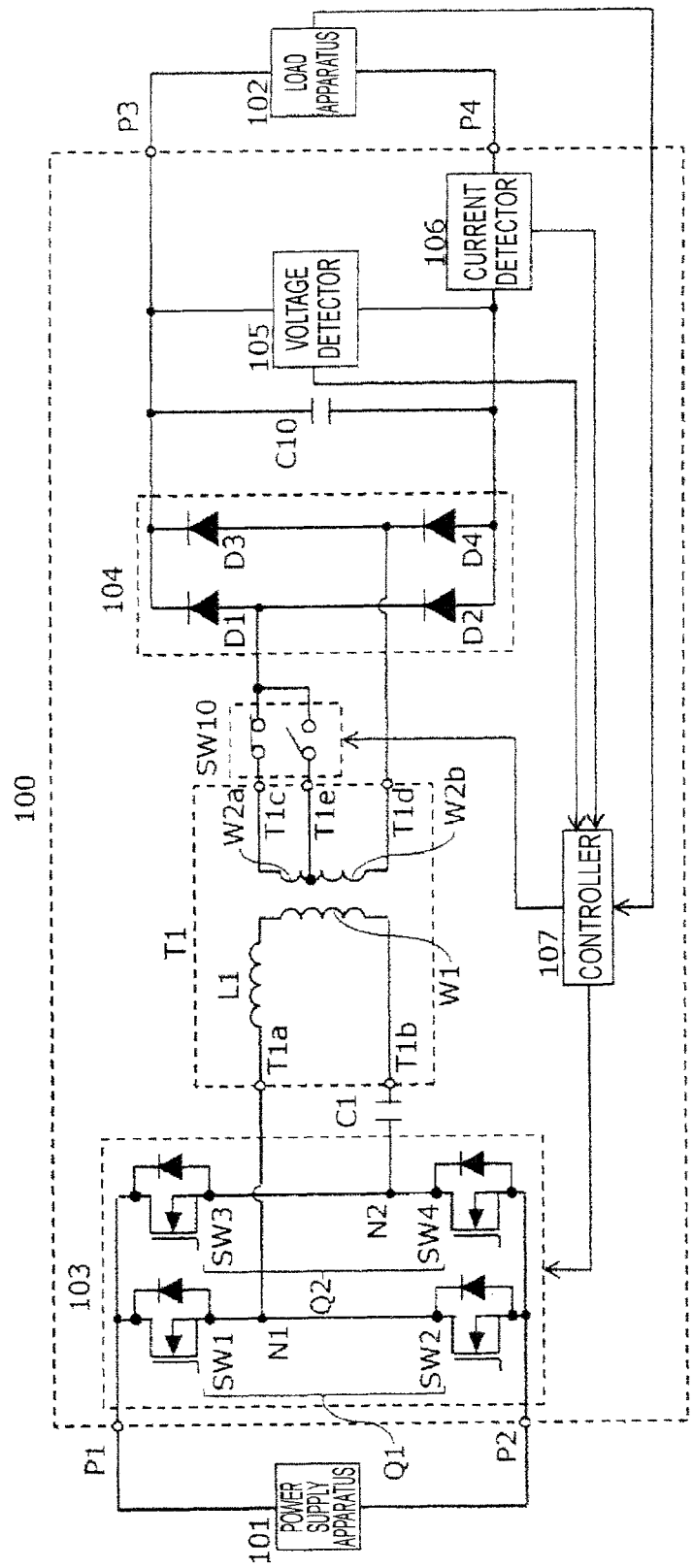
FIG. 1 is a block diagram illustrating a configuration of a power converter apparatus 100 according to a first embodiment.

Hereinafter, embodiments according to the present disclosure will be explained referring to the drawings. It is noted that all similar components in the following embodiments are denoted by the same reference numerals.

First Embodiment

Overall Configuration

FIG. 1 is a block diagram illustrating a configuration of a power converter apparatus 100 according to a first embodiment. The power converter apparatus 100 is connected to a DC power supply 101 and a DC load apparatus 102. The power converter apparatus 100 converts an input power having a predetermined voltage supplied from the power supply 101 into an output power having a predetermined voltage, and supplies the output power to the load apparatus 102.

The power converter apparatus 100 includes input terminals P1 and P2, a switching element group 103, a capacitor C1, a transformer T1, a switch circuit SW10, a rectifier circuit 104, a capacitor C10, output terminals P3 and P4, a voltage detector 105, a current detector 106, and a controller 107.

The input terminals P1 and P2 are connected to the power supply 101.

In the present specification, the input terminal P1 is also referred to as a "first input terminal", and the input terminal P2 is also referred to as a "second input terminal".

The switching element group 103 includes a plurality of leg circuits, each having two switching elements connected in series between the input terminals P1 and P2. In the example of FIG. 1, the switching element group 103 includes a leg circuit Q1 including switching elements SW1 and SW2, and a leg circuit Q2 including switching elements SW3 and SW4. In the example of FIG. 1, the switching elements SW1 to SW4 configure a full-bridge circuit. The switching elements SW1 to SW4 are MOSFETs, for example.

The transformer T1 includes a primary winding W1 with terminals T1a and T1b, and a secondary winding W2 with terminals T1c, T1d, and T1e. The secondary winding W2 includes a plurality of winding sections different from each other. In the example of FIG. 1, the secondary winding W2 includes a section W2a+W2b between the terminals T1c and T1d of the secondary winding as a first winding section, and includes a section W2b between the terminals T1d and T1e of the secondary winding as a second winding section. Therefore, the first and the second winding sections have different numbers of turns. In addition, the transformer T1 includes a leakage inductance L1 inside of the transformer T1.

In the present specification, the terminal T1a is also referred to as a "first terminal" of the primary winding of the transformer T1, and the terminal T1b is also referred to as a "second terminal" of the primary winding of the transformer T1. In addition, in the present specification, the terminal T1c is also referred to as a "first terminal" of the secondary winding of the transformer T1, the terminal T1d is also referred to as a "second terminal" of the secondary winding of the transformer T1, and the terminal T1e is also referred to as a "third terminal" of the secondary winding of the transformer T1.

The terminal T1a of the primary winding of the transformer T1 is connected to a node N1 between the switching elements SW1 and SW2. The terminal T1b of the primary winding of the transformer T1 is connected via the capacitor C1 to a node N2 between the switching elements SW3 and SW4.

The terminals T1c and T1e of the secondary winding of the transformer T1 are connected via the switch circuit SW10 to the rectifier circuit 104, and the terminal T1d of the secondary winding of the transformer T1 is connected to the rectifier circuit 104.

The switch circuit SW10 selectively connects one of the terminals T1c and T1e of the secondary winding of the transformer T1, to the rectifier circuit 104. In this case, the switch circuit SW10 connects the section W2a+W2b between the terminals T1c and T1d of the secondary winding, as the first winding section, to the secondary output circuit; and connects the section W2b of the secondary winding between the terminals T1d and T1e, as the second winding section, to the secondary output circuit.

In the first and the second embodiments, the rectifier circuit 104, the capacitor C10, the voltage detector 105, and the current detector 106 are also collectively referred to as an "output circuit".

The rectifier circuit 104 is a diode bridge including diodes D1 to D4, and is connected between the secondary winding of the transformer T1 and the output terminals P3 and P4. The rectifier circuit 104 rectifies current generated in the secondary winding of the transformer T1.

The capacitor C10 smooths the current rectified by the rectifier circuit 104.

The output terminals P3 and P4 are connected to the load apparatus 102.

In the present specification, the output terminal P3 is also referred to as a "first output terminal", and the output terminal P4 is also referred to as a "second output terminal".

The voltage detector 105 detects the output voltage Vout outputted from the power converter apparatus 100 to the load apparatus 102, and notifies the controller 107 of the detected output voltage Vout. The current detector 106 detects the output current Iout outputted from the power converter apparatus 100 to the load apparatus 102, and notifies the controller 107 of the detected output current Iout.

The controller 107 receives, from the load apparatus 102, a request signal that indicates a magnitude of target voltage Vreq to be outputted to the load apparatus 102. The controller 107 generates a control signal applied to a gate terminal of each of the switching elements SW1 to SW4, based on the target voltage Vreq, the output voltage Vout, and the output current Iout, to control each of the switching elements SW1 to SW4. The controller 107 operates the leg circuit Q1 including the switching elements SW1 and SW2, and the leg circuit Q2 including the switching elements SW3 and SW4, at a predetermined switching frequency fs. In addition, the controller 107 switches over the switch circuit SW10 in response to the output voltage Vout notified from the voltage detector 105, and switches over the terminals T1c and T1e of the secondary winding to be connected to the rectifier circuit 104.

Configuration of Transformer T1

The transformer T1 is configured so that, the leakage inductance of the transformer T1 when the terminal T1c of the secondary winding is connected to the rectifier circuit 104 (namely, the first winding section is connected thereto), is different from the leakage inductance of the transformer T1 when the terminal T1e of the secondary winding is connected to the rectifier circuit 104 (namely, the second winding section is connected thereto). For example, the transformer T1 is configured so that, the number of turns Ns1 of the first winding section is larger than the number of turns Ns2 of the second winding section, and, so that, the leakage inductance L11 of the transformer T1 when the first winding section is connected to the rectifier circuit 104, is smaller than the leakage inductance L12 of the transformer T1 when the second winding section is connected to the rectifier circuit 104.

In order to generate such leakage inductances, the transformer T1 is configured, for example, so that the distance from the primary winding W1 to the section W2b of the secondary winding W2, is larger than the distance from the primary winding W1 to the section W2a of the secondary winding W2.

Figure 2:
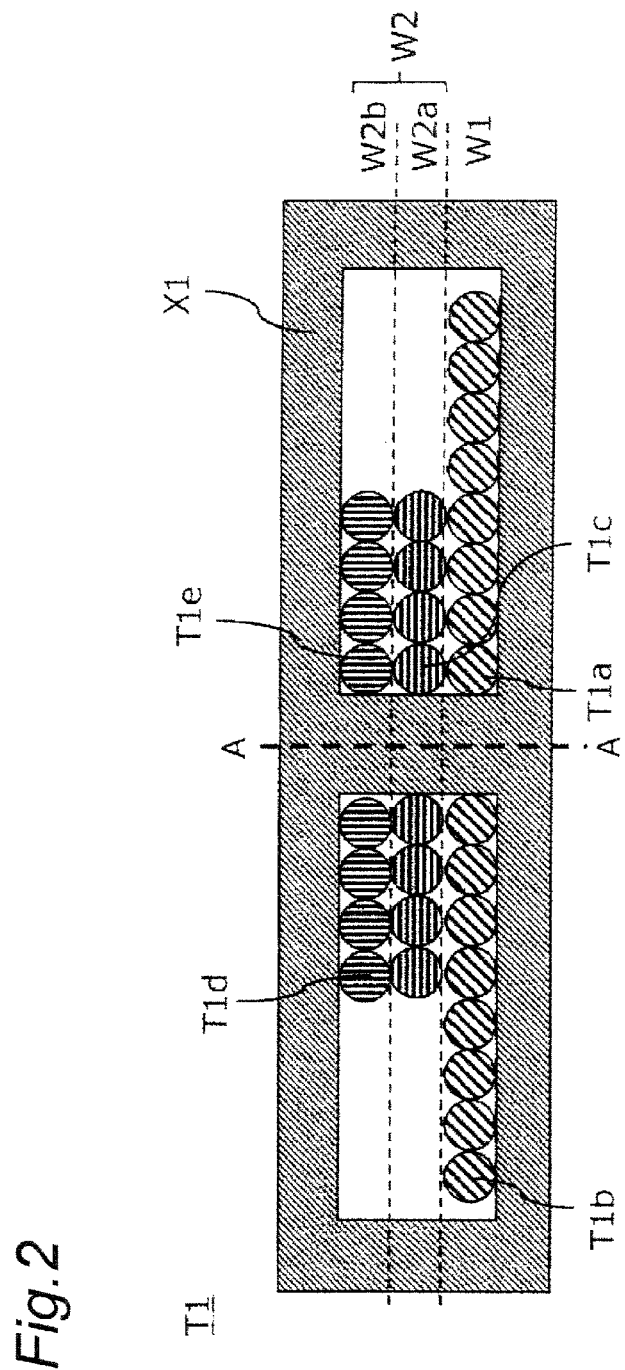
FIG. 2 is a cross-sectional view illustrating an exemplary configuration of a transformer T1 of FIG. 1.

FIG. 2 is a cross-sectional view illustrating an exemplary configuration of the transformer T1 of FIG. 1. The transformer T1 includes a core X1, the primary winding W1, and the secondary winding W2. The primary winding W1 and the secondary winding W2 are wound around an axis A-A. In the example of FIG. 2, the primary winding W1, the section W2a of the secondary winding W2, and the section W2b of the secondary winding W2 are arranged vertically. Namely, the primary winding W1, the section W2a of the secondary winding W2, and the section W2b of the secondary winding W2 are wound at different positions along the longitudinal direction of the axis A-A. This makes the distance from the primary winding W1 to the section W2b of the secondary winding W2 larger than the distance from the primary winding W1 to the section W2a of the secondary winding W2, and therefore, makes it possible to configure the transformer T1 that satisfies Ns1>Ns2 and L11<L12.

Figure 3:
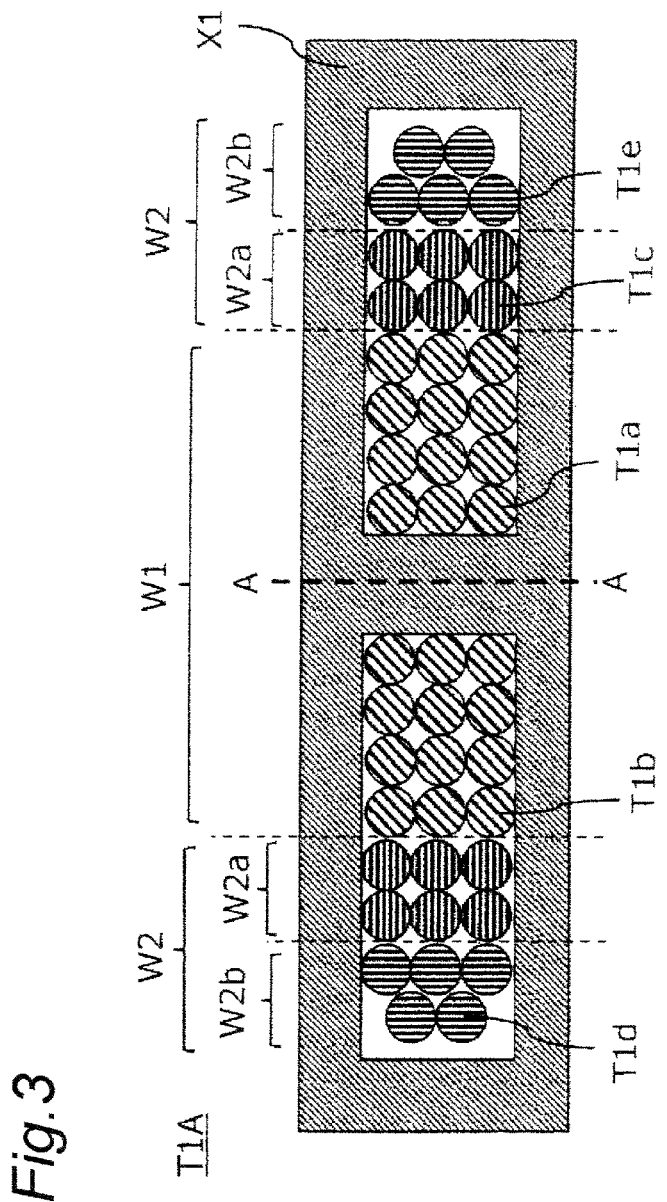
FIG. 3 is a cross-sectional view illustrating an exemplary configuration of a transformer T1A according to a modified embodiment of the first embodiment.

FIG. 3 is a cross-sectional view illustrating an exemplary configuration of a transformer T1A according to a modified embodiment of the first embodiment. In the example of FIG. 3, the primary winding W1, the section W2a of the secondary winding W2, and the section W2b of the secondary winding W2 are arranged side by side. Namely, the primary winding W1, the section W2a of the secondary winding W2, and the section W2b of the secondary winding W2 are wound at positions different distances away from the axis A-A. This makes the distance from the primary winding W1 to the section W2b of the secondary winding W2 larger than the distance from the primary winding W1 to the section W2a of the secondary winding W2, and therefore, makes it possible to configure the transformer T1 that satisfies Ns1>Ns2 and L11<L12.

It is noted that the structure of the transformer T1 is not limited to those illustrated in FIGS. 2 and 3. The advantageous effect of the present embodiment is obtainable as long as Ns1>Ns2 and L11<L12 are satisfied.

Although the transformer T1 has both of the primary leakage inductance and the secondary leakage inductance, the secondary leakage inductance can be converted to the primary leakage inductance. Hereinafter, the conversion of the leakage inductance will be explained with reference to FIGS. 4 to 6.

Figure 4:
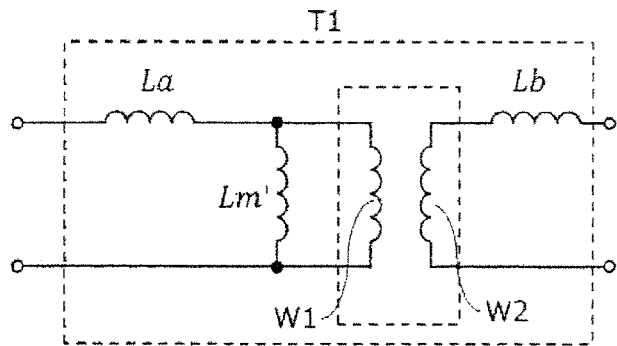
FIG. 4 is an equivalent circuit diagram illustrating a primary leakage inductance La and a secondary leakage inductance Lb of the transformer T1 of FIG. 1.

FIG. 4 is an equivalent circuit diagram illustrating the primary leakage inductance La and the secondary leakage inductance Lb of the transformer T1 of FIG. 1. La represents the primary leakage inductance, Lb represents the secondary leakage inductance, and Lm' represents an excitation inductance. The transformer includes the primary winding W1 with the number of turns Np, and the secondary winding W2 with the number of turns Ns.

Figure 5:
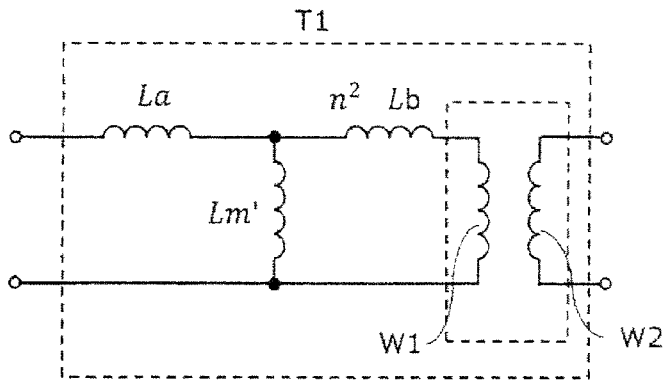
FIG. 5 is an equivalent circuit diagram illustrating a primary leakage inductance $n^2 \cdot Lb$ converted from the secondary leakage inductance Lb of FIG. 4.

FIG. 5 is an equivalent circuit diagram with an indication of primary leakage inductances $n^2 \cdot Lb$ converted from the secondary leakage inductance Lb of FIG. 4. Now, n represents a turn ratio n=Np/Ns.

Figure 6:
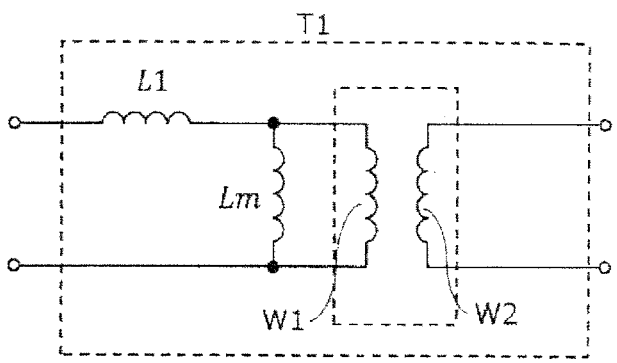
FIG. 6 is an equivalent circuit diagram illustrating a primary leakage inductance L1 further converted from the primary leakage inductance of FIG. 5.

FIG. 6 is an equivalent circuit diagram indicating the primary leakage inductance L1 further converted from the primary leakage inductance of FIG. 5. The leakage inductance L1, which is equivalent to the primary leakage inductance La and the secondary leakage inductance Lb of FIG. 4, is expressed by the following equation:

$$L1 = La + \frac{Lm' \cdot n^2 \cdot Lb}{Lm' + n^2 \cdot Lb}$$ [Equation 1]

Operation of Power Converter Apparatus 100

Figure 7:
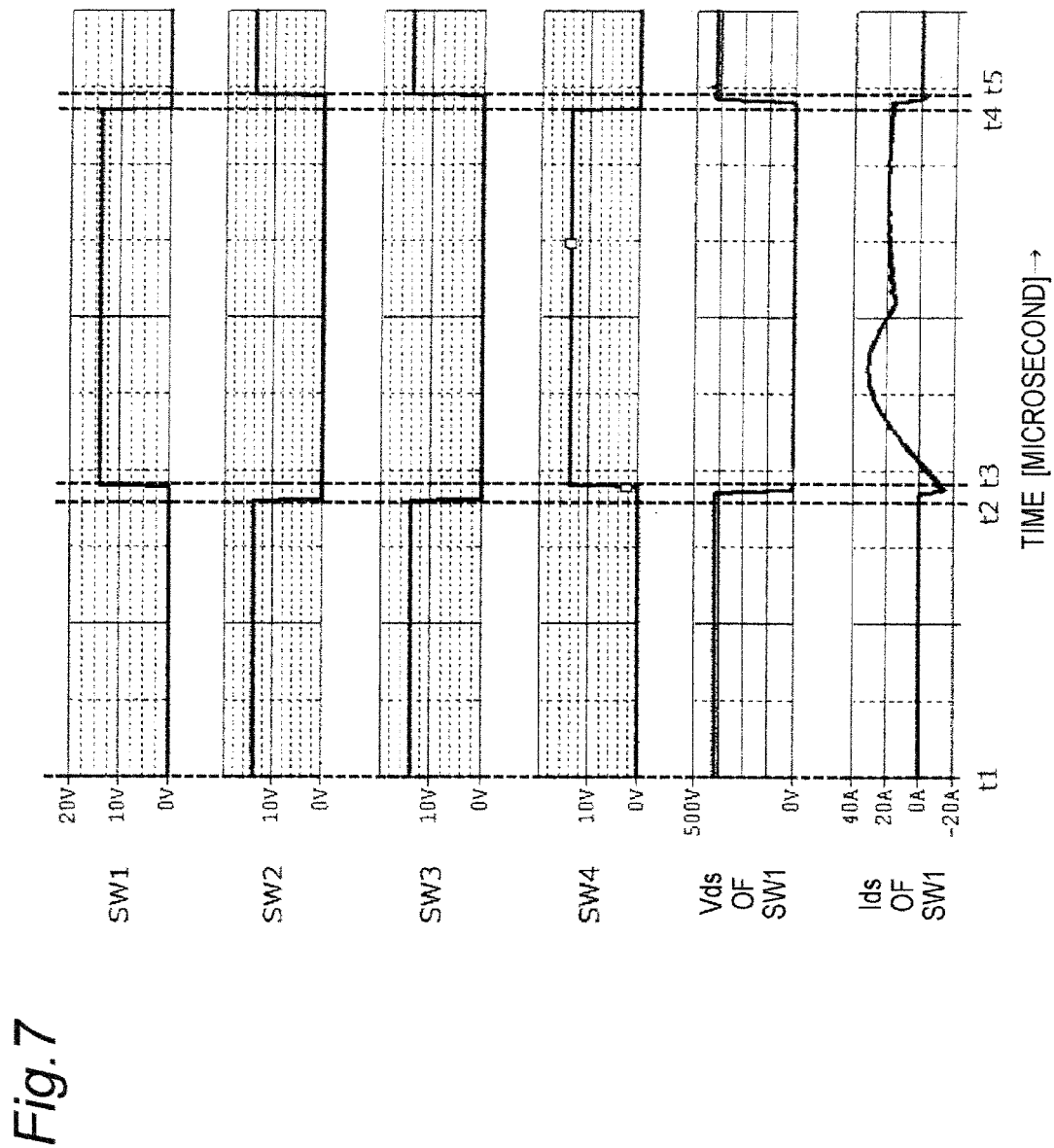
FIG. 7 is a waveform chart for explaining a fundamental operation of a power converter apparatus 100 of FIG. 1.

FIG. 7 is a waveform diagram for explaining a fundamental operation of the power converter apparatus 100 of FIG. 1. The first to fourth signal charts of FIG. 7 illustrate control signals applied to the gate terminals of the switching elements SW1, SW2, SW3, and SW4. The fifth signal chart of FIG. 7 illustrates a voltage Vds (drain-source voltage) applied to both ends of the switching element SW1. The sixth signal chart of FIG. 7 illustrates a current Ids (drain-source current) that flows through the switching element SW1.

In the time interval from the time t1 to the time t2 of FIG. 7, the switching elements SW2 and SW3 are kept turned on. The current in this state flows through the path of "P1-->SW3-->C1-->T1-->SW2-->P2".

Upon turning-off of the switching elements SW2 and SW3 at the time t2 of FIG. 7, a current flows through the path of "P2-->body diode of SW4-->C1-->T1-->body diode of SW1-->P1". Within the time interval over which the current flows through the body diode of the switching element SW1 and the body diode of the switching element SW4, the switching elements SW1 and SW4 become turned on at the time t3. This enables the switching elements SW1 and SW4 to operate in zero voltage switching.

Within the time interval from the time t3 to the time t4 of FIG. 7, the switching elements SW1 and SW4 are kept turned on. The current in this state flows through the path of "P1-->SW1-->T1-->C1-->SW4-->P2".

Upon turning-off of the switching elements SW1 and SW4 at the time t4 of FIG. 7, a current then flows through the path of "P2-->body diode of SW2-->T1-->C1-->body diode of SW3-->P1". Within the time interval over which the current flows through the body diode of the switching element SW2 and the body diode of the SW3, the switching elements SW2 and SW3 become turned on at the time t5. This enables the switching elements SW2 and SW3 to operate in zero voltage switching.

The power converter apparatus 100 includes at least one capacitor C1 connected between the terminal T1a or T1b of the primary winding of the transformer T1, and the nodes N1 and N2 between the two switching elements in the leg circuits Q1 and Q2, respectively. This leads that the primary winding of the transformer T1, the leakage inductance L1, and the capacitor C1 configure an LLC resonance circuit.

Now, the operation of the LLC resonant power converter apparatus of the prior art will be explained.

In order to generate output voltage over a wide voltage range, the LLC resonant power converter apparatus needs to operate the respective switching elements over a wide range of switching frequency. When lowering the switching frequency, the iron loss increases in a core of the transformer, and increase of the switching frequency increases the copper loss in the winding of the transformer. In order to reduce the iron loss and the copper loss of the transformer, it is necessary to increase the size of the transformer. In addition, increase of the switching frequency also results in increase of the loss of the respective switching elements.

We now consider, as an exemplary power converter apparatus of the prior art, a circuit that includes a transformer; four switching elements and capacitors provided on the primary side of the transformer; and a rectifier circuit and a capacitor provided on the secondary side of the transformer. The four switching elements are connected in a shape of bridge. The primary capacitor is connected between the node that resides between the two switching elements in either of the leg circuit Q1 or Q2, and the primary winding of the transformer.

The following parameters are introduced to the power converter apparatus.
- fs: a switching frequency of each of the switching elements;
- L1: a leakage inductance of the transformer;
- Np: a number of turns of the primary winding of transformer;
- Ns: a number of turns of the secondary winding of transformer;
- Ae: an effective cross-sectional area of the transformer;
- Lp: an inductance of the primary winding of the transformer;
- Vf: a forward voltage of each of the diodes of the rectifier circuit; and
- Vo: an output voltage of the power converter apparatus.

Now the maximum amount of change ΔB of magnetic flux density of the transformer is given by the equation below.

$$\Delta B = \frac{n(Vo + 2 \cdot Vf)}{2 \cdot fs \cdot Mv \cdot Np \cdot Ae}$$ [Equation 2]

Where n=Np/Ns. In addition, Mv corresponds to the reciprocal of the degree of coupling, which is expressed by the equation below.

$$Mv = \sqrt{\frac{Lp}{Lp - L1}}$$ [Equation 3]

The Iron loss Pcv of the transformer is approximately calculated by the Steinmetz equation below.

$$Pcv = Cm \cdot fs^x \cdot \Delta B^y \cdot Ae \cdot le$$ [Equation 4]

where Cm, x, and y are coefficients that depend on types of the transformer core, and le represents an effective magnetic path length.

It is understood from the Equations 2 to 4 that the more the switching frequency fs decreases, the more the iron loss of the transformer core increases, as described previously.

In addition, the more the switching frequency increases, the more the copper loss of the winding increases, and also the loss of the respective switching elements increases, as described previously.

Hereinafter, how the power converter apparatus 100 of the first embodiment can generate the output power having higher efficiency over wider voltage range, than that of the prior art, will be explained.

Figure 8:
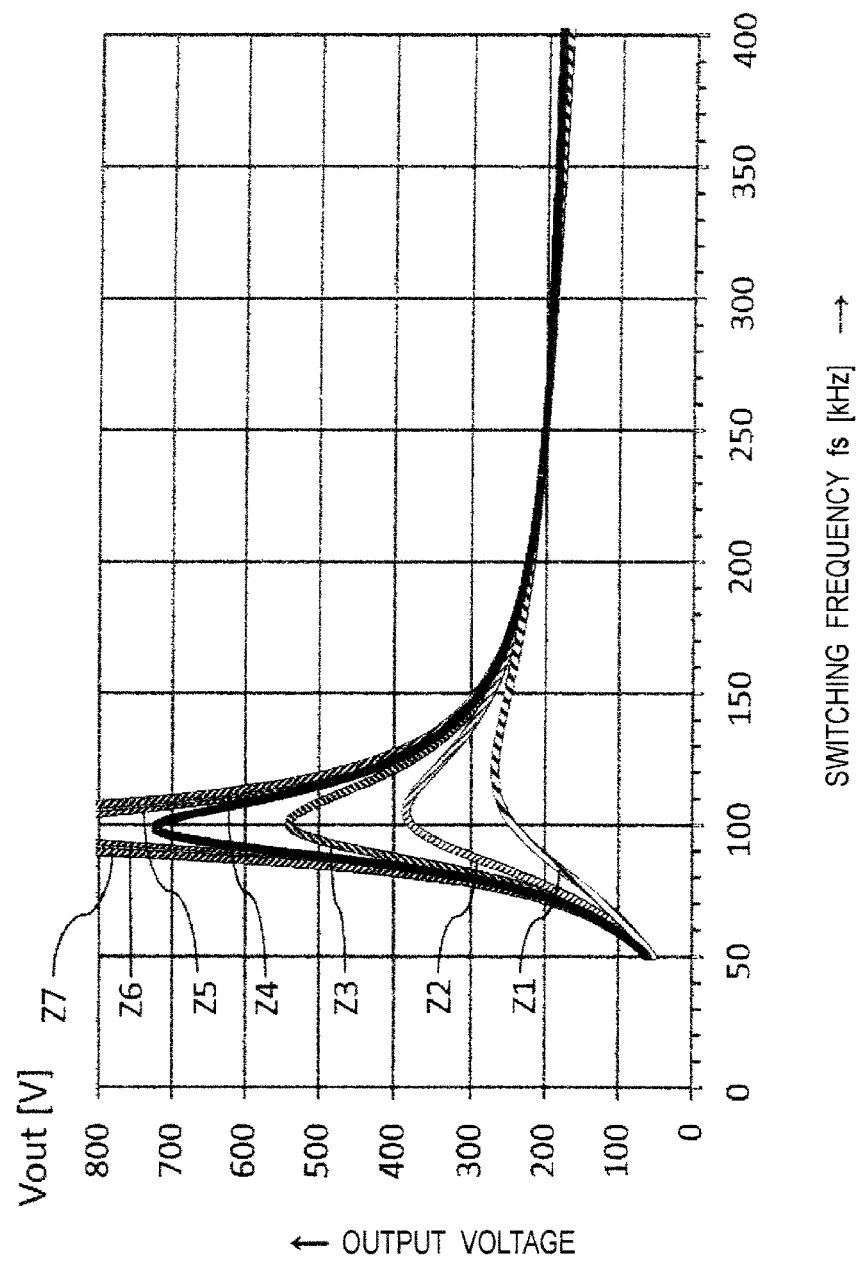
FIG. 8 is a graph illustrating characteristics of the output voltage Vout to the switching frequency fs of the power converter apparatus 100, during operation of an LLC resonance circuit with a terminal T1e of the secondary winding connected to a rectifier circuit 104.

FIG. 8 is a graph illustrating characteristics of the output voltage Vout to the switching frequency fs of the power converter apparatus 100, during operation of the LLC resonance circuit with the terminal T1e of the secondary winding connected to the rectifier circuit 104. Namely, FIG. 8 illustrates characteristics of the output voltage Vout to the switching frequency fs of the power converter apparatus 100, when the section W2b of the secondary winding W2 with the number of turns Ns2 is connected to the rectifier circuit 104, and the transformer T1 has the leakage inductance L12. As apparent from FIG. 8, the power converter apparatus 100 has different characteristics depending on impedances Z1 to Z7 of the load apparatus 102.

The power converter apparatus 100 has a ratio of the output voltage Vout to the input voltage Vin, or gain, which changes depending on the capacitance and the inductance, that are contained in the path leading from the input terminal P1, via the switching element turned on and the primary winding of the transformer T1, to the input terminal P2, and also changes depending on the impedance or the resistance of the load apparatus 102.

The gain K of the power converter apparatus 100 is formularized, for example, as the following equation:

$$K(Q, m, f) = \frac{f^2 \cdot (m-1)}{\sqrt{(m \cdot f^2 - 1)^2 + f^2 \cdot (f^2 - 1)^2 \cdot (m-1)^2 \cdot Q^2}}$$ [Equation 5]

Now, the following parameters are used.
Q: a Q factor regarding the capacitor C1 and the leakage inductance L1;
m: a ratio of the inductance Lp of the primary winding of the transformer to the leakage inductance L1; and
f: a normalized switching frequency.
The Q value is given by the following equation:

$$Q = \frac{\sqrt{\frac{L1}{C1}}}{Rac}$$ [Equation 6]

$$Rac = \frac{8}{\pi^2} \cdot \frac{Np^2}{Ns^2} \cdot Ro$$ [Equation 7]

where Ro represents the impedance or the resistance of the load apparatus 102, and Rac represents the equivalent load resistance observed on the primary side.

The inductance ratio m is given by the following equation:

$$m = \frac{Lp}{L1}$$ [Equation 8]

The normalized switching frequency f is given by the following equation:

$$f = \frac{fs}{fr}$$ [Equation 9]

where fr represents a resonance frequency related to the capacitor C1 and the leakage inductance L1, and is given by the following equation:

$$fr = \frac{1}{2\pi\sqrt{L1 \cdot C1}}$$ [Equation 10]

The gain K equivalently represents the ratio of the secondary AC output voltage of the transformer T1, to the AC input voltage applied to the LLC resonance circuit on the primary side of the transformer T1.

Multiplying the gain K multiplied by the input voltage Vin of the power converter apparatus 100 can lead to the output voltage Vout illustrated in FIG. 8.

It can be understood from the equation 5 that the power converter apparatus 100 generates the output voltage Vout, that changes depending on the capacitance and the inductance of the LLC resonance circuit, that changes depending on the impedance or the resistance of the load apparatus 102, and that changes depending on the switching frequency fs.

The impedance or the resistance of the load apparatus 102 can be obtained as the ratio Vout/Iout of the output voltage Vout to the output current Iout, based on the output voltage Vout and the output current Iout detected by using the voltage detector 105 and the current detector 106. The impedance or the resistance of the load apparatus 102 may be obtained as $Vout^2/Pout$, based on the output power Pout.

Referring to FIG. 8, the impedances Z1 to Z7 of the load apparatus 102 were set as follows. It is noted that the following output voltages Vout and the output currents Iout are detected by the voltage detector 105 and the current detector 106, under the condition that the power converter apparatus 100 generates a constant output power Pout=Vout×Iout=7040 W.

$Z1=5.7\Omega$(Vout=200 V, Iout=35.2 A);

$Z2=8.9\Omega$(Vout=250 V, Iout=28.2 A);

$Z3=12.8\Omega$(Vout=300 V, Iout=23.4 A);

$Z4=17.4\Omega$(Vout=350 V, Iout=20.1 A);

$Z5=22.7\Omega$(Vout=400 V, Iout=17.6 A);

$Z6=28.8\Omega$(Vout=450 V, Iout=15.6 A); and $Z7=35.5\Omega$(Vout=500 V, Iout=14.1 A).

Figure 9:
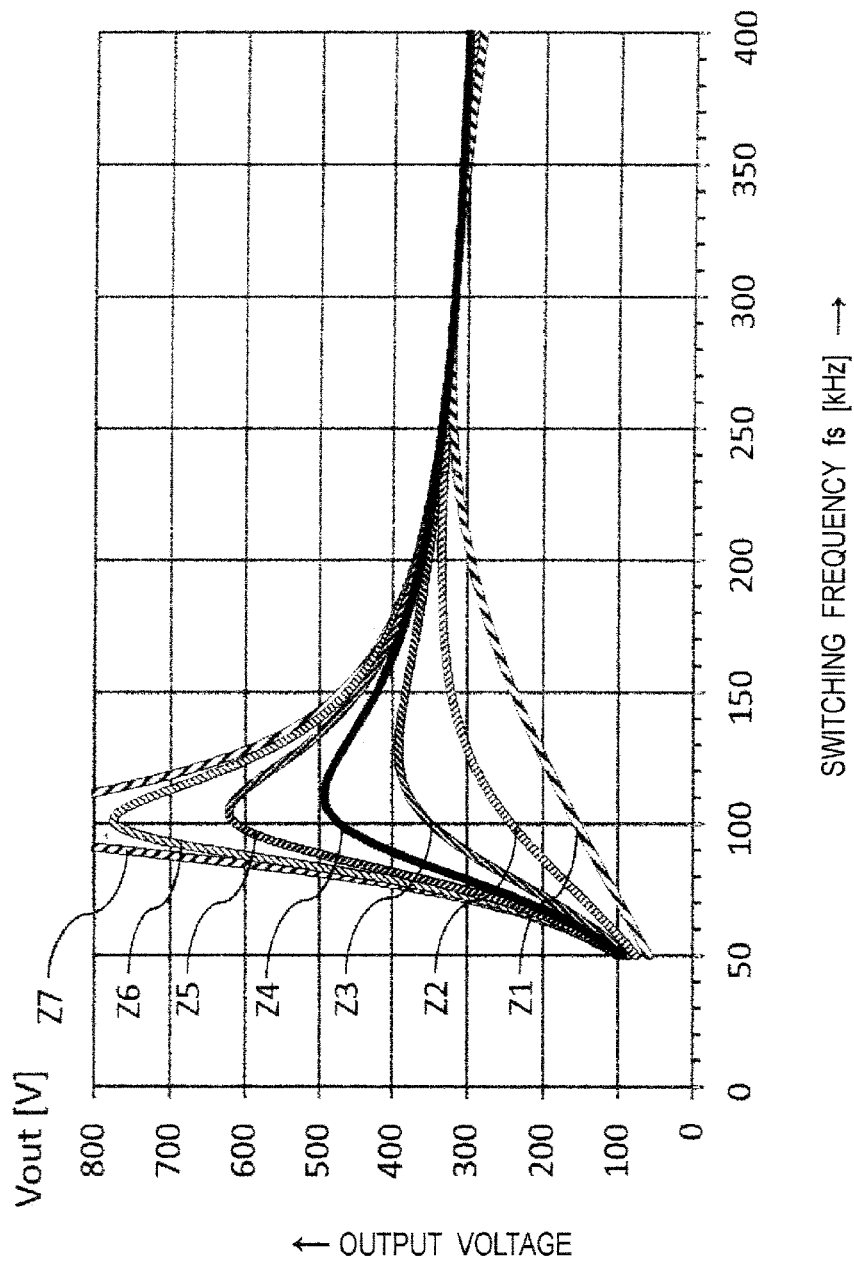
FIG. 9 is a graph illustrating characteristics of the output voltage Vout to the switching frequency fs of the power converter apparatus 100, during operation of an LLC resonance circuit with a terminal T1c of the secondary winding connected to the rectifier circuit 104.

FIG. 9 is a graph illustrating characteristics of the output voltage Vout to the switching frequency fs of the power converter apparatus 100, during operation of an LLC resonance circuit, with the terminal T1c of the secondary winding connected to the rectifier circuit 104. Namely, FIG. 9 illustrates characteristics of the output voltage Vout to the switching frequency fs of the power converter apparatus 100, when the section W2a+W2b of the secondary winding W2 with the number of turns Ns1 is connected to the rectifier circuit 104, and the transformer T1 has the leakage inductance L11. In the present embodiment, the values were set to satisfy L11=0.7×L12 and Ns1=1.6×Ns2. In the case of FIG. 9, the conditions same as those in FIG. 8 were set for the input voltage Vin, the inductance Lp of the primary winding, the capacitor C1, and the number of turns Np of the primary winding.

Also in FIG. 9, the impedances Z1 to Z7 of the load apparatus 102 were set to the same as those of FIG. 8, respectively.

It can be understood from FIGS. 8 and 9, that the power converter apparatus 100 generates the output voltage Vout that changes depending on the leakage inductance L1 of the LLC resonance circuit, that changes depending on the number of turns Ns of the secondary winding W2 of the transformer T1, that changes depending on the impedances Z1 to Z7 of the load apparatus 102, and that changes depending on the switching frequency fs. When it is operated at the same switching frequency fs, the LLC resonance circuit with the terminal T1c of the secondary winding connected to the rectifier circuit 104 (namely, with the number of turns Ns1 of the secondary winding W2, and with the leakage inductance L11) will generate the output voltage Vout, larger than the output voltage Vout generated by the LLC resonance circuit with the terminal T1e of the secondary winding connected to the rectifier circuit 104 (namely, with the number of turns Ns2 of the secondary winding W2, and with the leakage inductance L12). Moreover, when it is operated at the same output voltage Vout, the LLC resonance circuit with the terminal T1c of the secondary winding connected to the rectifier circuit 104 (namely, with the number of turns Ns1 of the secondary winding W2, and with the leakage inductance L11), will have the switching frequency fs, higher than the switching frequency fs of the LLC resonance circuit with the terminal T1e of the secondary winding connected to the rectifier circuit 104 (namely, with the number of turns Ns2 of the secondary winding W2, and with the leakage inductance L12). Therefore, the power converter apparatus 100 can generate the output voltage over a wide voltage range with higher efficiency than that of the prior art, by selectively connecting one of the plurality of different winding sections of the secondary winding W2 to the output circuit by the switch circuit SW10.

The controller 107 determines which terminal of the secondary winding to be connected to the rectifier circuit 104, depending on which of the plurality of predetermined voltage ranges the output voltage Vout belongs to, and controls the SW10. In this way, the controller 107 selectively operates the LLC resonance circuit with the number of turns Ns1 of the secondary winding W2 and the leakage inductance L11, or the LLC resonance circuit with the number of turns Ns2 of the secondary winding W2 and the leakage inductance L12.

In addition, the controller 107 determines the switching frequency fs based on: the capacitance and the inductance that are contained in the path leading from the input terminal P1, via the switching elements SW1 to SW4 turned on by the controller 107, and the primary winding of the transformer T1, to the input terminal P2; the output voltage Vout and the output current Iout; and the target voltage Vreq to be outputted to the load apparatus 102.

In addition, the impedance or resistance of the load apparatus 102 can be found from the output voltage Vout and the output current Iout, as described previously. Based on the LLC resonance circuit in use, and the impedance or the resistance of the load apparatus 102, the characteristic of the output voltage Vout to the switching frequency fs of the power converter apparatus 100 at present can be determined. At this time, whether to increase or decrease the switching frequency fs based on the target voltage Vreq can be determined.

The characteristic of the output voltage Vout to the switching frequency fs of the power converter apparatus 100 has been already known at the time the power converter apparatus 100 was designed and manufactured, for both the cases where the secondary winding is connected to the rectifier circuit 104 through the terminal T1c, and through the terminal T1e. The controller 107 compares the characteristics of the plurality of LLC resonance circuits, and determines which LLC resonance circuit to be operated. The conditions for determining the LLC resonance circuit to be operated are determined, taking the characteristics of the output voltage Vout to the switching frequency fs (slope of the curve, for example), the range of the output voltage Vout of the power converter apparatus 100, the characteristics of the transformer T1 and so forth into consideration. For example, in consideration of the trade-off of loss of the transformer T1, the middle point voltage in the range of the output voltage Vout (namely, the sum of (the maximum voltage and the minimum voltage) divided by two) is set as a threshold value with which the LLC resonance circuit to be operated is determined. Within the range from the minimum to the middle point voltage, the LLC resonance circuit capable of outputting the minimum to the middle point voltage in a lower switching frequency range is employed. Within the range from the middle point to the maximum voltage, the LLC resonance circuit capable of outputting the middle point voltage to the maximum voltage in a higher switching frequency range is employed. This makes the transformer T1 less likely that the losses will occur. A threshold value different from the middle point voltage may be used depending on the characteristic of the LLC resonance circuit to be operated.

For example, if the output voltage Vout notified from the voltage detector 105 is larger than the threshold voltage Vcth set on the controller 107, the switch circuit SW10 is switched over to connect the terminal T1c of the secondary winding to the rectifier circuit 104. Namely, if the output voltage Vout is larger than the threshold voltage Vcth, the transformer T1 will have the number of turns Ns1 of the secondary winding W2, and the leakage inductance L11. If the output voltage Vout notified from the voltage detector 105 is smaller than the threshold voltage Vcth set on the controller 107, the switch circuit SW10 is switched over to connect the terminal T1e of the secondary winding to the rectifier circuit 104. Namely, if the output voltage Vout is smaller than the threshold voltage Vcth, the transformer T1 will have the number of turns Ns2 of the secondary winding W2, and the leakage inductance L12.

Figure 10:
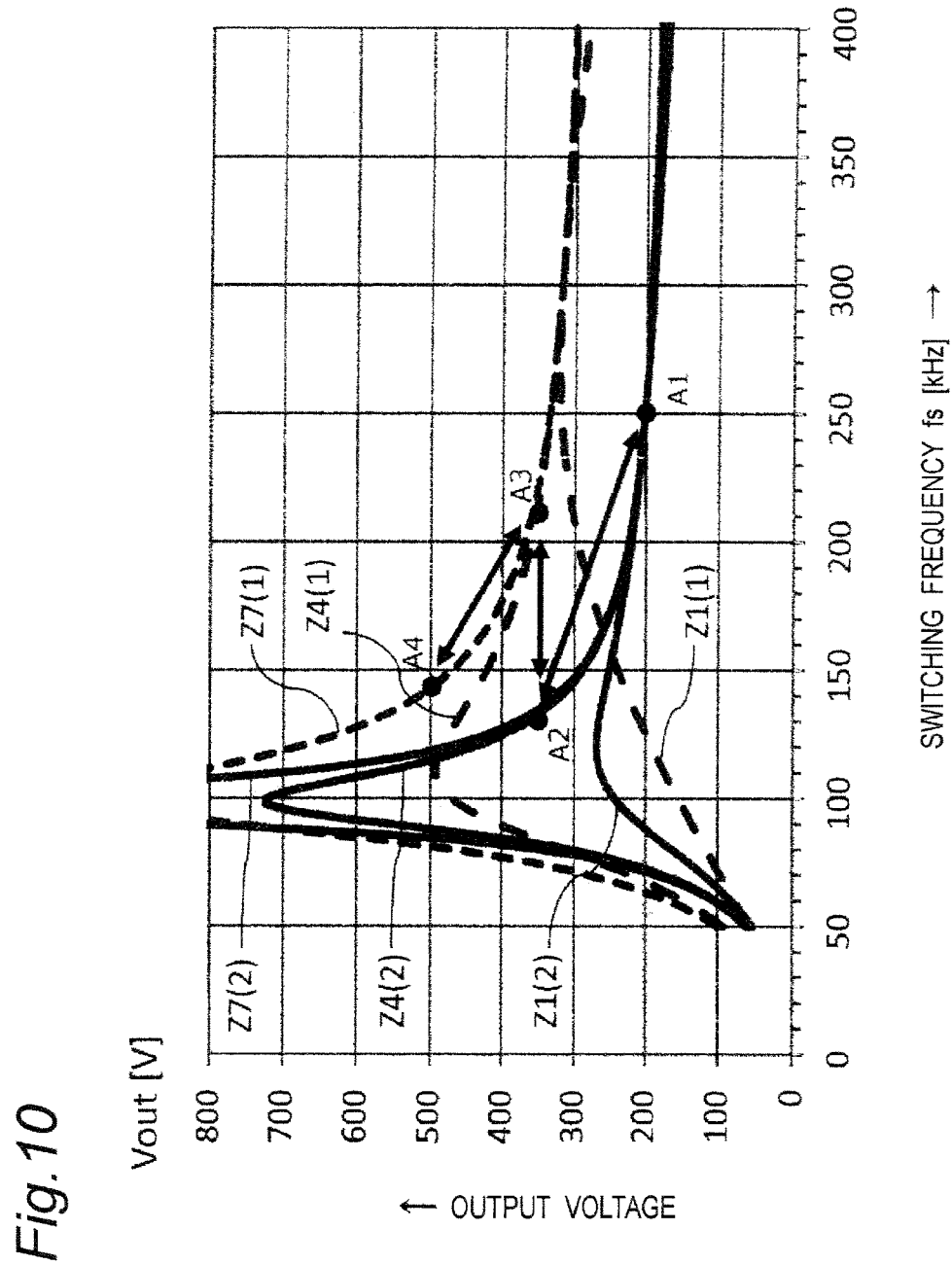
FIG. 10 is a graph for explaining determination of the LLC resonance circuit and the switching frequency fs by a controller 107 of FIG. 1.

FIG. 10 is a graph for explaining determination of the LLC resonance circuit and the switching frequency fs by the controller 107 of FIG. 1. FIG. 10 illustrates the cases only with the impedances Z1, Z4, and Z7 set on the load apparatus 102, chosen from the plots of FIGS. 8 and 9 for simplicity of illustration. The example of FIG. 10 determines which of the terminal T1c or T1e of the secondary winding to be connected to the rectifier circuit 104, depending on which region, 350 V or higher, or lower than 350 V bounded by the threshold value Vout=350 V, the output voltage Vout belongs to.

In an exemplary case where the output voltage Vout=200 V in the initial state is lower than the threshold voltage 350 V, and the target voltage Vreq=500 V is higher than the threshold voltage 350 V, the power converter apparatus 100 operates as follows. First of all, if the output voltage Vout is lower than the threshold voltage 350 V (between points A1 and A2), the controller 107 operates the LLC resonance circuit, to control the switch circuit SW10 to connect the rectifier circuit 104 with the terminal T1e of the secondary winding. Hence, the power converter apparatus 100 can generate a low output voltage Vout, to operate at a relatively low switching frequency fs. The controller 107 gradually increases the output voltage Vout, by gradually decreasing the switching frequency fs. Upon arrival of the output voltage Vout at the threshold voltage 350 V (point A2), the controller 107 operates the LLC resonance circuit, to control the switch circuit SW10 to connect the rectifier circuit 104 with the terminal T1c of the secondary winding. The controller 107 concurrently changes the switching frequency fs, depending on characteristic of the LLC resonance circuit that involves the capacitor C1 (point A2-->point A3). Hence, the power converter apparatus 100 can generate a high output voltage Vout, to operate at a relatively high switching frequency fs. The controller 107 gradually increases the output voltage Vout to the target voltage Vreq (from points A3 to A4), by gradually decreasing the switching frequency fs.

In the case of making only the LLC resonance circuit with the terminal T1e of the secondary wiring connected to the rectifier circuit 104 operate, the power converter apparatus has to switch over the switching frequency fs over the range from approximately 120 to 260 kHz, in order to generate the output voltage Vout over the range from 200 V to 500 V, for example. In addition, in the case of making only the LLC resonance circuit with the terminal T1c of the secondary winding connected to the rectifier circuit 104 operate, the power converter apparatus has to switch over the switching frequency fs over the range from approximately 140 to 620 kHz (range at or above 400 kHz not illustrated), for example, in order to generate the output voltage Vout in the range of 200V to 500V. In contrast, the power converter apparatus 100 can generate the output voltage Vout over the range from 200 V to 500 V, at the switching frequency fs changed over the range from approximately 140 to 260 kHz, by switching over the terminals T1c or T1e of the secondary winding to be connected to the rectifier circuit 104, to selectively operate the LLC resonance circuit. In this way, according to the power converter apparatus 100, reducing the range of changing the switching frequency fs can make the loss associated with the low switching frequency fs and high switching frequency fs, less likely to occur.

Figure 11:
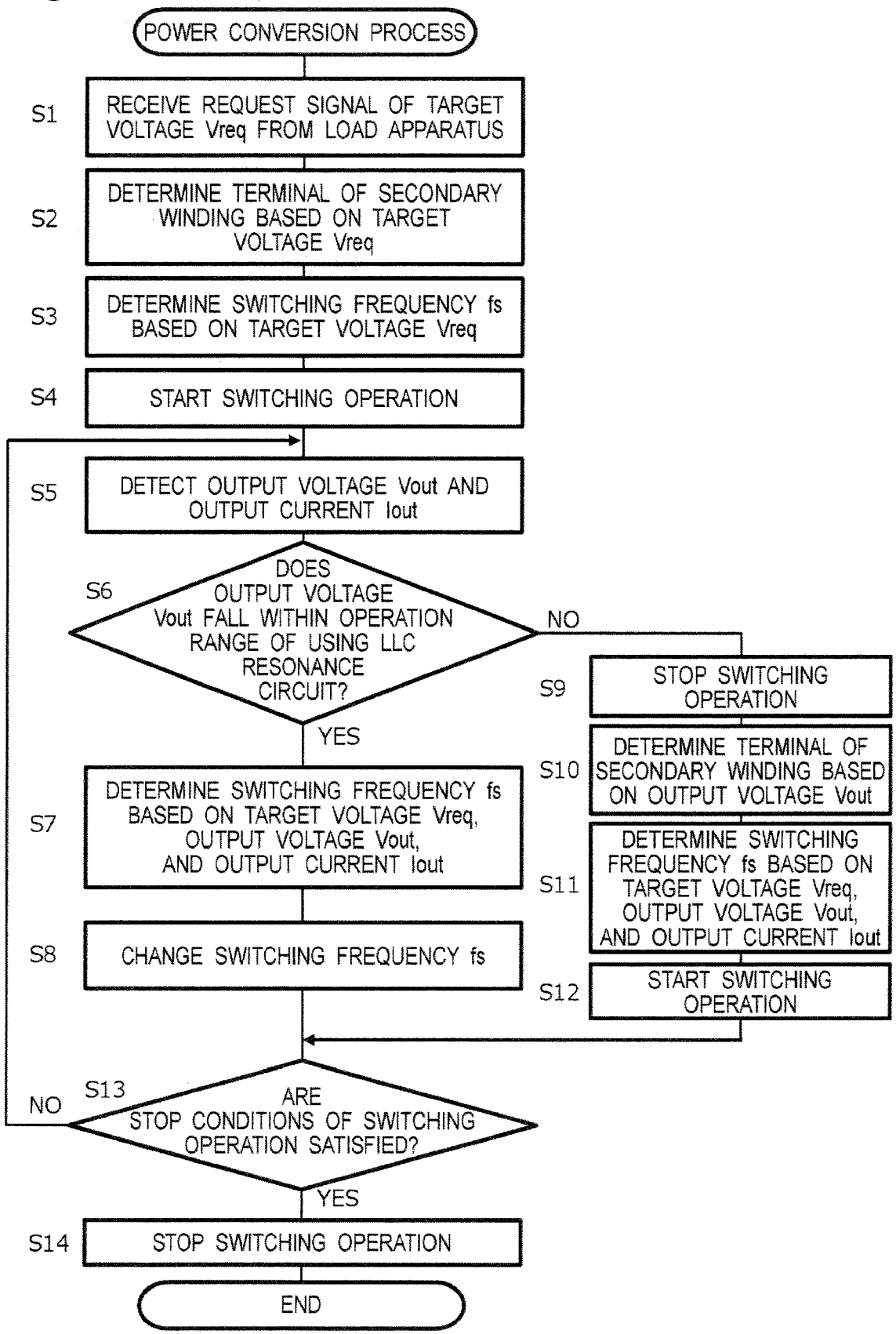
FIG. 11 is a flowchart illustrating a power conversion process executed by the controller 107 of FIG. 1.

FIG. 11 is a flow chart illustrating a power conversion process executed by the controller 107 of FIG. 1.

In the initial state of the power conversion process of FIG. 11, only the controller 107 operates, while the respective switching elements SW1 to SW4 remain unoperated, and the output voltage Vout is kept at zero.

In step S1, the controller 107 receives a request signal of the target voltage Vreq from the load apparatus 102. In step S2, the controller 107 determines which terminal of the secondary winding to be connected to the rectifier circuit 104, depending on which of the plurality of predetermined voltage ranges the target voltage Vreq belongs to (for example, whether the target voltage Vreq is equal to or higher than a threshold voltage of 350 V or not). In step S3, the controller 107 determines the switching frequency fs, based on the target voltage Vreq. Although the impedance or resistance of the load apparatus 102 at this timing remains unknown, the controller 107 determines the switching frequency fs, by using the characteristic of the output voltage Vout to the switching frequency fs having been determined according to some initial value of the impedance Z of the load apparatus 102. In step S4, the controller 107 starts the switching operation of the switching elements SW1 to SW4.

In step S5, the controller 107 detects the output voltage Vout and the output current Iout. In step S6, the controller 107 determines whether or not the output voltage Vout falls within the operation range of the using LLC resonance circuit (for example, whether the voltage is equal to or higher than a threshold voltage of 350 V or not). The control flow advances to step S7 if YES in step S6, and advances to step S9 if NO in step S6.

In step S7, the controller 107 determines the switching frequency fs, based on the target voltage Vreq, the output voltage Vout, and the output current Iout. In step S8, the controller 107 changes the switching frequency fs.

In step S9, the controller 107 stops the switching operation of the switching elements SW1 to SW4. In step S10, the controller 107 determines the terminal of the secondary winding to be connected to the rectifier circuit 104, based on the output voltage Vout. In step S11, the controller 107 determines the switching frequency fs based on the target voltage Vreq, the output voltage Vout, and the output current Iout. In step S12, the controller 107 starts the switching operation of the switching elements SW1 to SW4.

In step S13, the controller 107 determines whether the stop conditions of the switching operation are satisfied or not. If YES, the control flow advances to step S14, and if NO, the control flow returns back to S5. For the case where the load apparatus 102 is given as a charging apparatus, for example, the stop conditions include reception of a notification signal that indicates full charge, by the controller 107 from the load apparatus 102. Alternatively, the stop conditions may include detection of some abnormality (operation of a protection circuit), reception of a stop signal from the external, and so forth. In step S14, the controller 107 stops the switching operation of the switching elements SW1 to SW4.

As described above, the power converter apparatus 100 of the first embodiment is an LLC resonant power converter apparatus, and can generate the output voltage over a wide voltage range with higher efficiency than that of the prior art.

With the power converter apparatus 100 of the first embodiment, it now becomes possible to avoid both operations at excessively low switching frequency fs and excessively high switching frequency fs. Hence, the iron loss of the core and the copper loss of the winding will be made less likely to occur, without upsizing the transformer T1. In addition, since operations at an excessively high switching frequency fs is avoidable, also the loss of the switching elements SW1 to SW4 will be made less likely to occur.

For example, when the load apparatus 102 is a charging apparatus, the internal voltage increases as the time elapses from the start of charging, and therefore, it is necessary to increase the voltage to be supplied to the load apparatus 102. The power converter apparatus 100 of the first embodiment can change the output voltage Vout, in response to such change in the state of the load apparatus 102.

Second Embodiment

The first embodiment has described the power converter apparatus that includes, in the primary side, the plurality of switching elements configured as the full-bridge circuit. The second embodiment will explain a power converter apparatus that includes, in the primary side, a plurality of switching elements configured as a half-bridge circuit.

Figure 12:
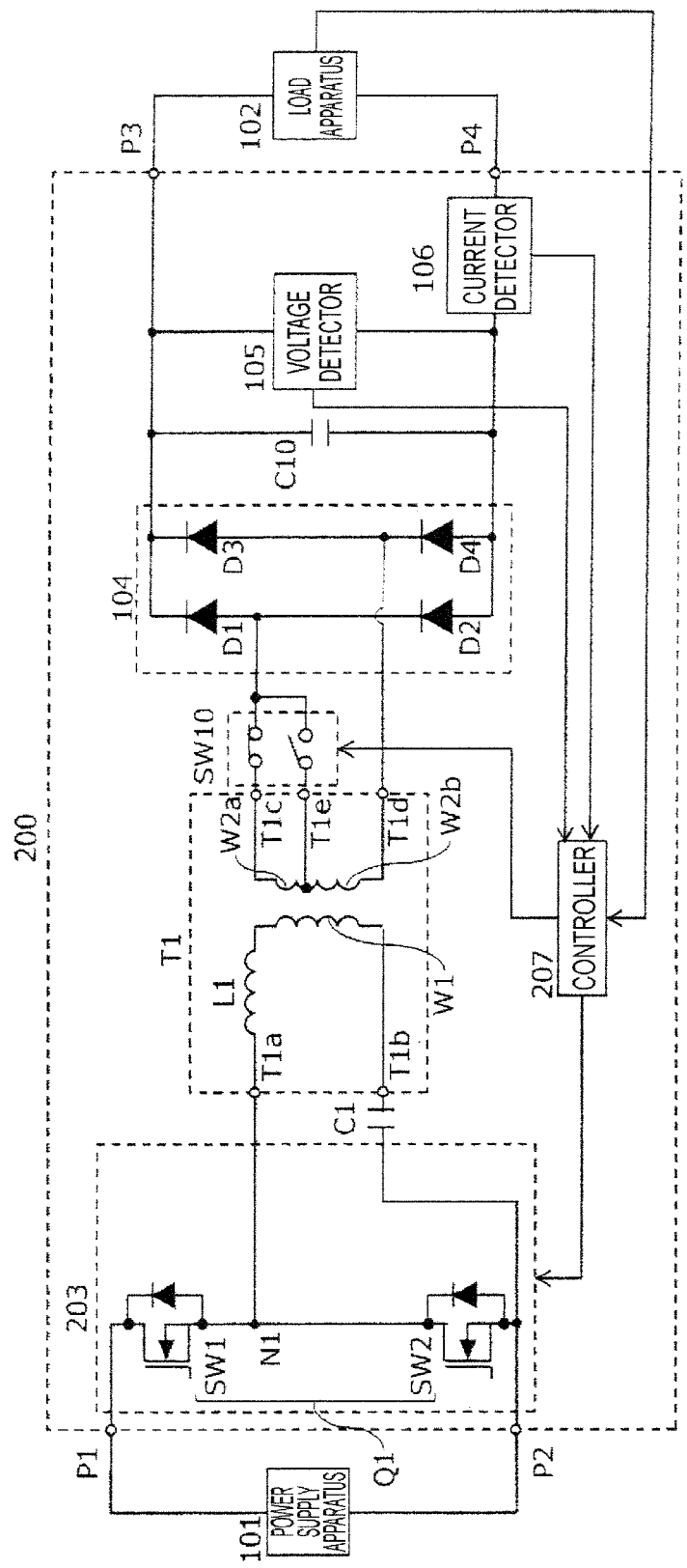
FIG. 12 is a block diagram illustrating a configuration of a power converter apparatus 200 according to a second embodiment.

FIG. 12 is a block diagram illustrating a configuration of a power converter apparatus 200 of the second embodiment. The power converter apparatus 200 includes a switching element group 203 and a controller 207, in place of the switching element group 103 and the controller 107 of FIG. 1. The power converter apparatus 200 has such a configuration that the switching elements SW3 and SW4 are omitted from the power converter apparatus 100 of FIG. 1. The terminal T1a of the primary winding of the transformer T1 is connected to the node N1 between the switching elements SW1 and SW2. The terminal T1b of the primary winding of the transformer T1 is connected via the capacitor C1 to the input terminal P2. In addition, this case is understood as the LLC resonant power converter apparatus similar to the power converter apparatus of the first embodiment, capable of generating the output voltage over a wide voltage range, with higher efficiency than that of the prior art.

Third Embodiment

The first and second embodiments explained the power converter apparatus that includes the rectifier circuit of diode bridge type on the secondary side, and, includes the switch circuit between the secondary winding and the rectifier circuit, for selective connection of one of the plurality of winding sections of the secondary winding to the output circuit. On the other hand, the third embodiment will describe a power converter apparatus, that includes a rectifier circuit having a plurality of switching elements (synchronous rectifier circuit) on the secondary side, and uses such rectified circuit to selectively connect one of a plurality of winding sections of a secondary winding to an output circuit.

Overall Configuration

Figure 13:
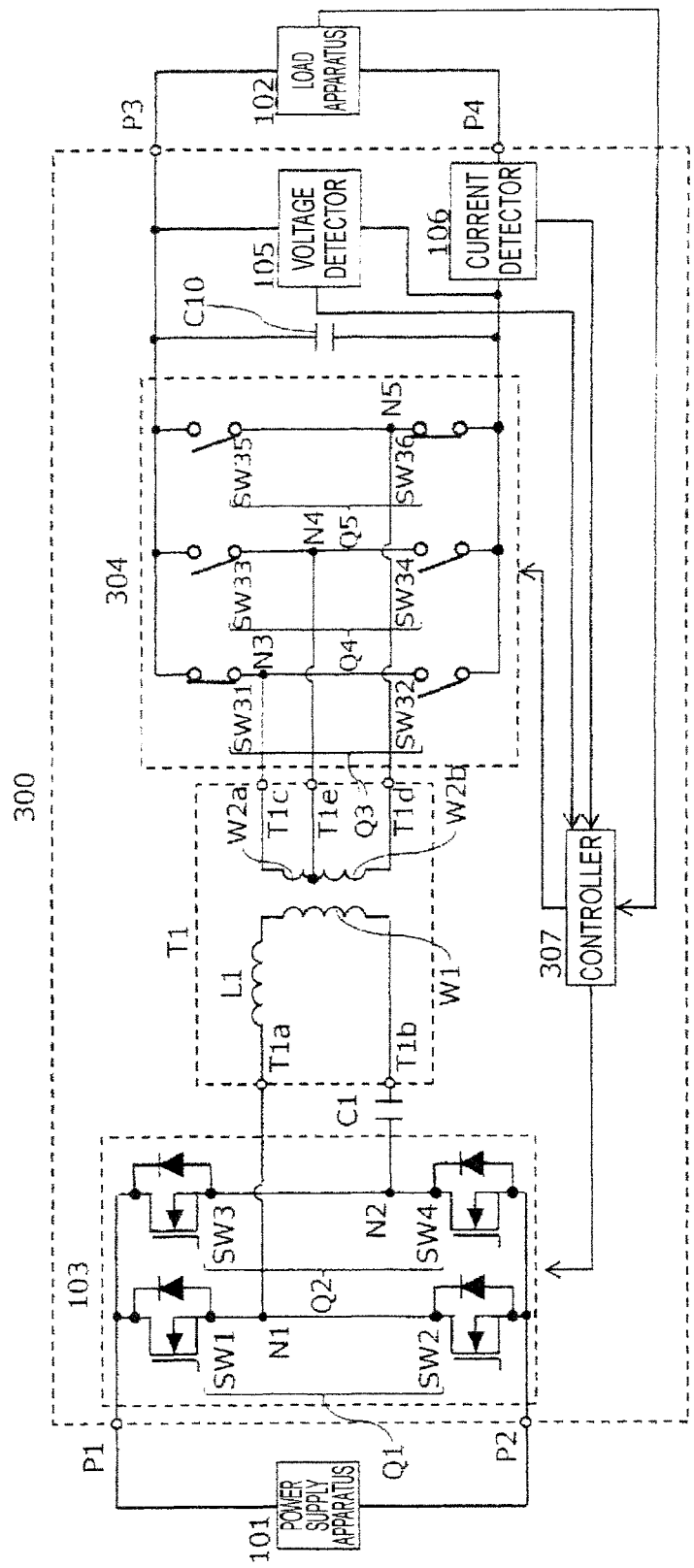
FIG. 13 is a block diagram illustrating a configuration of a power converter apparatus 300 according to a third embodiment.

FIG. 13 is a block diagram illustrating a configuration of a power converter apparatus 300 of the third embodiment. The power converter apparatus 300 includes a rectifier circuit 304 and a controller 307, in place of the switch circuit SW10, the rectifier circuit 104, and the controller 107 of FIG. 1.

The rectifier circuit 304 includes at least three leg circuits each having two switching elements connected in series to each other, and each connected to one of at least three terminals T1c to T1e of the secondary winding W2. In the example of FIG. 13, the rectifier circuit 304 includes a leg circuit Q3 that includes switching elements SW31 and SW32, a leg circuit Q4 that includes switching elements SW33 and SW34, and a leg circuit Q5 that includes switching elements SW35 and SW36. The terminal T1c of the secondary winding W2 of the transformer T1 is connected to a node N3 between the switching elements SW31 and SW32. The terminal T1e of the secondary winding W2 of the transformer T1 is connected to a node N4 between the switching elements SW33 and SW34. The terminal T1d of the secondary winding W2 of the transformer T1 is connected to a node N5 between the switching elements SW35 and SW36.

Figure 14:
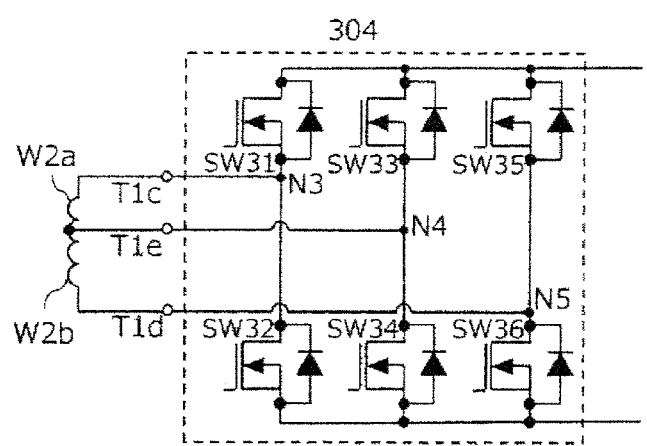
FIG. 14 is a circuit diagram illustrating an exemplary implementation of the rectifier circuit 304 of FIG. 13.

FIG. 14 is a circuit diagram illustrating an exemplary implementation of the rectifier circuit 304 of FIG. 13. The switching elements SW31 to SW36 are, for example, MOSFETs each containing a body diode.

Under the control of the controller 307, the rectifier circuit 304 uses two of the three leg circuits Q3 to Q5 to connect either the section W2a+W2b (first winding section) or the section W2b (second winding section) of the secondary winding W2, to the secondary output circuit, and, synchronously rectifies a current generated in one winding section of the secondary winding W2, and supplies the current to the secondary output circuit.

In the third and fourth embodiments, the capacitor C10, the voltage detector 105, and the current detector 106 are also collectively referred to as an "output circuit".

The controller 307 generates a control signal to be applied to the gate terminals of the switching elements SW1 to SW4, and controls the switching elements SW1 to SW4, in a manner similar to that of the controller 107 of FIG. 1.

In addition, the controller 307 controls the rectifier circuit 304 to connect either the section W2a+W2b or the section W2b of the secondary winding W2 to the output circuit, depending on the output voltage Vout notified by the voltage detector 105. For connecting the section W2a+W2b to the output circuit, the controller 307 turns off the switching elements SW33 and SW34. For connecting the section W2b to the output circuit, the controller 307 turns off the switching elements SW31 and SW32.

In addition, the controller 307 controls the rectifier circuit 304 to synchronously rectify the current generated in one winding section of the secondary winding W2, and to supply the current to the output circuit. When synchronously rectifying the current generated in the section W2a+W2b, the controller 307 turns on/off the switching elements SW31, SW32, SW35, and SW36 of the rectifier circuit 304, in synchronization with the switching elements SW1 to SW4 on the primary side, as described later referring to FIGS. 14 and 15. The controller 307 in this timing keeps the switching elements SW33 and SW34 turned off, as described previously. On the other hand, when synchronously rectifying the current generated in the section W2b, the controller 307 turns on/off the switching elements SW33, SW34, SW35, and SW36 of the rectifier circuit 304, in synchronization with the switching elements SW1 to SW4 on the primary side, as described later referring to FIGS. 16 and 17. The controller 307 in this timing keeps the switching elements SW31 and SW32 turned off, as described previously.

The other components of the power converter apparatus 300 of FIG. 13 are configured and operated in a manner similar to that of the corresponding components of the power converter apparatus 100 of FIG. 1.

The rectifier circuit 304 substantially operates as the rectifier circuit 104 of the first and second embodiments, and also operates as the switch circuit SW10. Therefore, the rectifier circuit 304 of the third and fourth embodiments will be also referred to as a "switch circuit".

In the third and fourth embodiments, each of the leg circuits Q1 and Q2 in the switching element groups 103 and 203 is also referred to as a "first leg circuit". In addition, in the third and fourth embodiments, each of the leg circuits Q3 to Q5 in the rectifier circuit 304 is also referred to as a "second leg circuit".

Operations of Power Converter Apparatus 300

Figure 15:
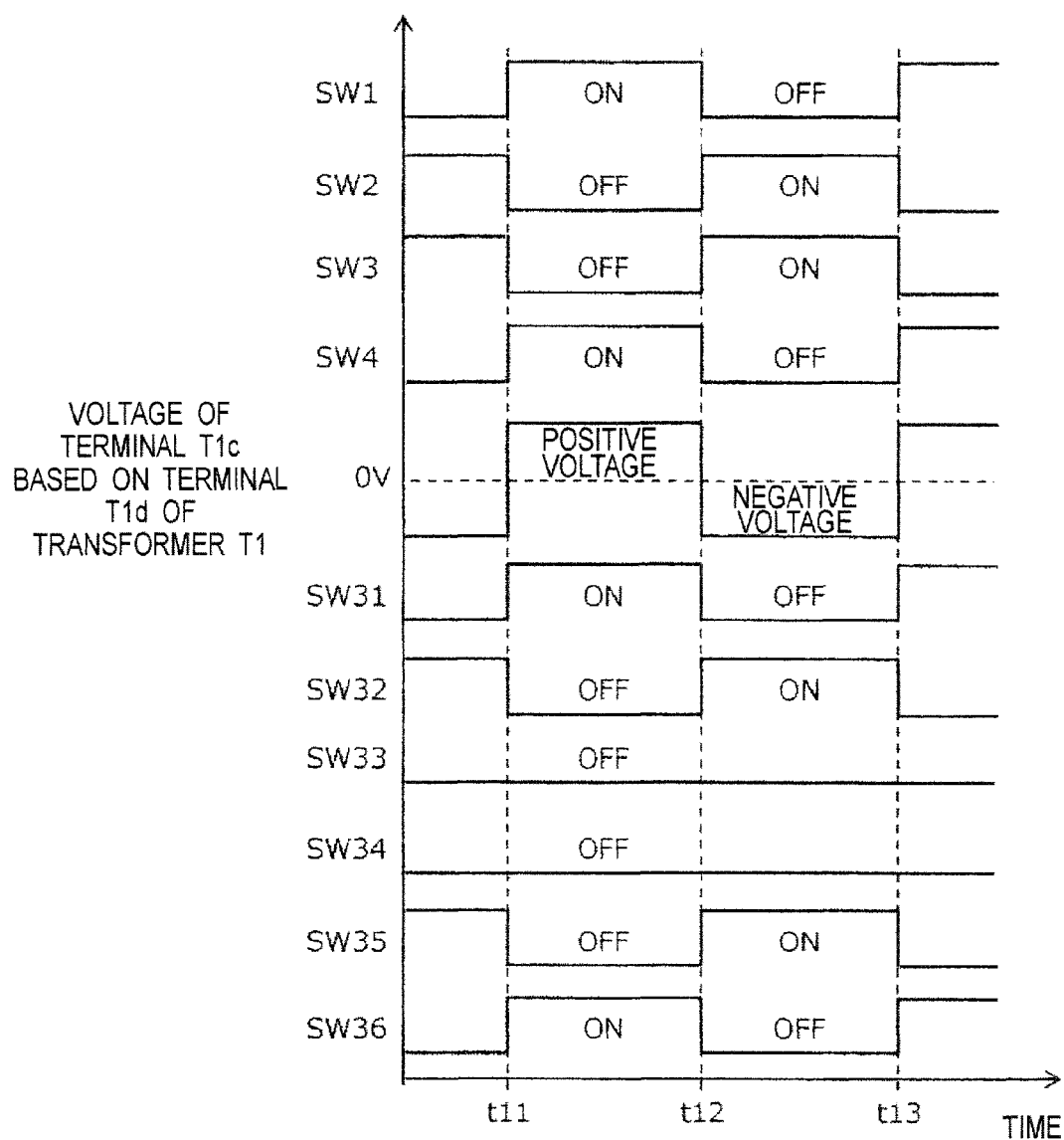
FIG. 15 is a timing chart illustrating operations of switching elements SW1 to SW4 and SW31 to SW36 in the power converter apparatus 300 of FIG. 13, when a section W2a+W2b of a secondary winding W2 is connected to the output circuit.

FIG. 13 also illustrates operations of the rectifier circuit 304, when the section W2a+W2b of the secondary winding W2 is connected to the output circuit. As illustrated in FIG. 13, the switching elements SW33 and SW34 are kept turned off, in order to connect the section W2a+W2b to the output circuit. FIG. 15 is a timing chart illustrating operations of the switching elements SW1 to SW4 and SW31 to SW36 in the power converter apparatus 300 of FIG. 13, when the section W2a+W2b of the secondary winding W2 is connected to the output circuit. The first to fourth signal charts of FIG. 15 illustrate control signals applied to the gate terminals of the switching elements SW1 to SW4 on the primary side, respectively. The fifth signal chart of FIG. 15 schematically illustrates a waveform of voltage at the terminal T1c when viewed from the terminal T1d of the secondary winding of the transformer T1, expressed in a square wave. The sixth to eleventh signal charts in FIG. 15 illustrate control signals applied to the gate terminals of the switching elements SW31 to SW36 of the rectifier circuit 304. In FIG. 15, the dead times of the respective control signals are not shown for simplicity of illustration.

In the time interval from the time t11 to the time t12 of FIG. 15, the switching elements SW1 and SW4 are turned on, and the switching elements SW2 and SW3 are turned off, then the voltage at the terminal T1c when viewed from the terminal T1d of the secondary winding of the transformer T1 become positive. Hence, the voltage at the output terminal P3 when viewed from the output terminal P4 becomes positive when the switching elements SW31 and SW36 are turned on and the switching elements SW32 and SW35 are turned off.

In the time interval from the time t12 to the time t13 of FIG. 15, the switching elements SW2 and SW3 are turned on, and the switching elements SW1 and SW4 are turned off, then the voltage at the terminal T1c when viewed from the terminal T1d of the secondary winding of the transformer T1 becomes negative. Hence, the voltage at the output terminal P3 when viewed from the output terminal P4 becomes positive when the switching elements SW32 and SW35 are turned on and the switching elements SW31 and SW36 are turned off.

The switching elements SW33 and SW34 are kept turned off over the time interval from t11 to t13 of FIG. 15, in order to connect the section W2a+W2b to the output circuit.

Figure 16:
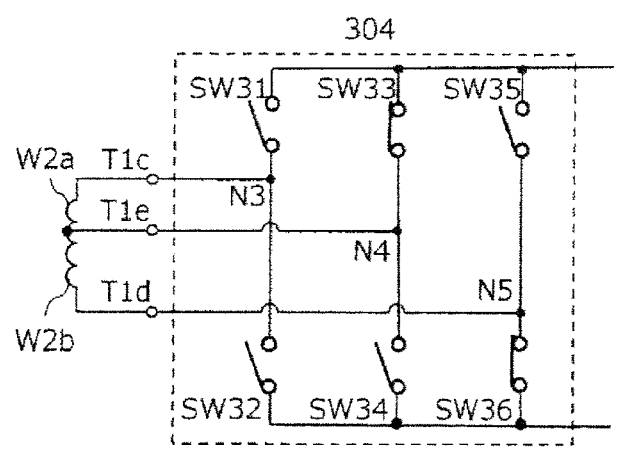
FIG. 16 is a circuit diagram for explaining an operation of the rectifier circuit 304 in the power converter apparatus 300 of FIG. 13, when a section W2b of the secondary winding W2 is connected to the output circuit.
Figure 17:
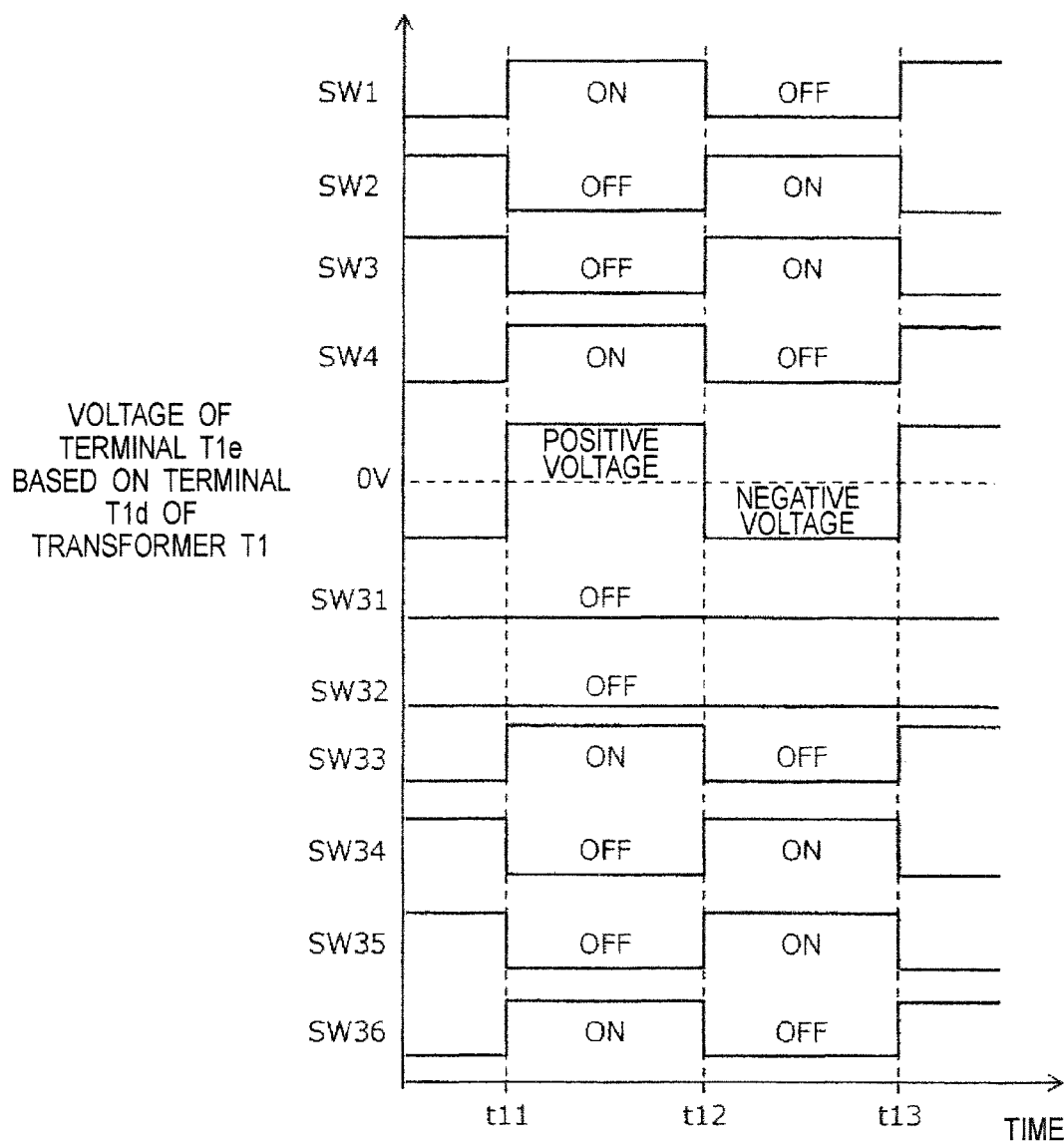
FIG. 17 is a timing chart illustrating operations of the switching elements SW1 to SW4 and SW31 to SW36 in the power converter apparatus 300 of FIG. 13, when the section W2b of the secondary winding W2 is connected to the output circuit.

FIG. 16 is a circuit diagram for explaining an operation of the rectifier circuit 304 in the power converter apparatus 300 of FIG. 13, when the section W2b of the secondary winding W2 is connected to the output circuit. As illustrated in FIG. 16, the switching elements SW31 and SW32 are kept turned off, in order to connect the section W2b to the output circuit. FIG. 17 is a timing chart illustrating operations of the switching elements SW1 to SW4 and SW31 to SW36 in the power converter apparatus 300 of FIG. 13, when the section W2b of the secondary winding W2 is connected to the output circuit. The respective signal charts of FIG. 17 represent the same signals as the respective signal charts of FIG. 15.

In the time interval from the time t11 to the time t12 of FIG. 17, the switching elements SW1 and SW4 are turned on, and the switching elements SW2 and SW3 are turned off, then the voltage at the terminal T1c when viewed from the terminal T1d of the secondary winding of the transformer T1 becomes positive. Hence, the voltage at the output terminal P3 when viewed from the output terminal P4 becomes positive when the switching elements SW33 and SW36 are turned on and the switching elements SW34 and SW35 are turned off.

In the time interval from the time t12 to the time t13 of FIG. 17, the switching elements SW2 and SW3 are turned on, and the switching elements SW1 and SW4 are turned off, then the voltage at the terminal T1c when seen from the terminal T1d of the secondary winding of the transformer T1 becomes negative. Hence, the voltage at the output terminal P3 when viewed from the output terminal P4 becomes positive when the switching elements SW34 and SW35 are turned on and the switching elements SW33 and SW36 are turned off.

The switching elements SW31 and SW32 are kept turned off, in order to connect the section W2b to the output circuit, over the time interval from the time t11 to the time t13 of FIG. 17.

The power converter apparatus 300 of the third embodiment is an LLC resonant power converter apparatus similar to the power converter apparatus 100 of the first embodiment, and can generate the output voltage over a wide voltage range, with higher efficiency than that of the prior art.

In addition, the power converter apparatus 300 of the third embodiment, benefited from provision of the rectifier circuit 304 for synchronous rectification, can reduce the loss more largely than that of the case where a rectifier circuit of diode bridge type is employed.

Modified Embodiment of Rectifier Circuit

Figure 18:
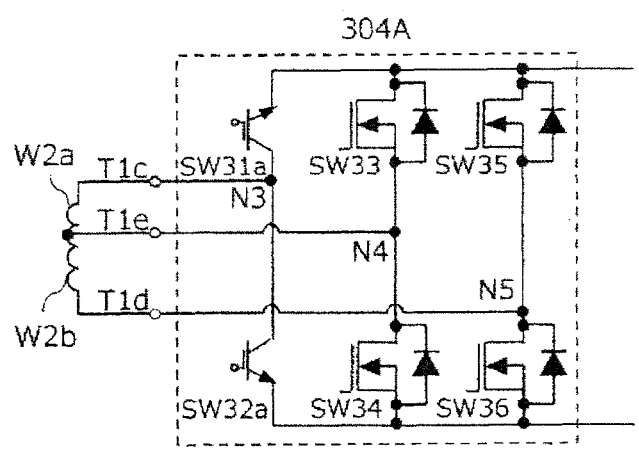
FIG. 18 is a circuit diagram illustrating a first modified embodiment of the rectifier circuit 304 of FIG. 13.

FIG. 18 is a circuit diagram illustrating a first modified embodiment of the rectifier circuit 304 of FIG. 13. A rectifier circuit 304A of FIG. 18 includes reverse-blocking switching elements SW31a and SW32a that have a sufficient withstand voltage against reverse bias voltage, in place of the MOSFET-based switching elements SW31 and SW32 of FIG. 14. The switching element SW31a allows the current to flow only upwards when turned on, and blocks the current when turned off. The switching element SW32a allows the current to flow only downwards when turned on, and blocks the current when turned off. The switching elements SW31a and SW32a are insulated gate bipolar transistors (IGBT), for example.

Figure 19:
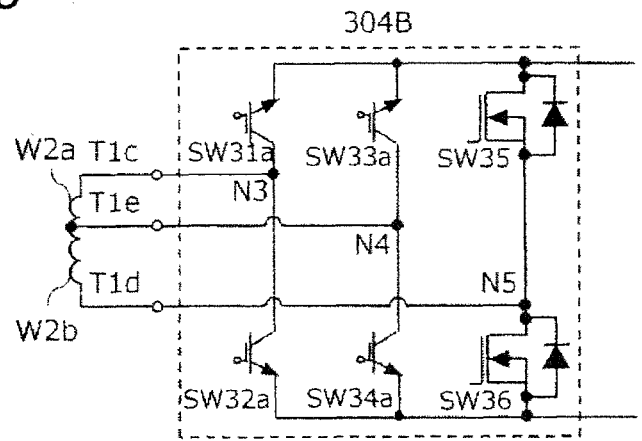
FIG. 19 is a circuit diagram illustrating a second modified embodiment of the rectifier circuit 304 of FIG. 13.

FIG. 19 is a circuit diagram illustrating a second modified embodiment of the rectifier circuit 304 of FIG. 13. A rectifier circuit 304B of FIG. 19 includes reverse-blocking switching elements SW33a and SW34a that have a sufficient withstand voltage against reverse bias voltage, in place of the MOSFET-based switching elements SW33 and SW34 of FIG. 18. The switching element SW33a allows the current to flow only upwards when turned on, and blocks the current when turned off. The switching element SW34a allows the current to flow only downwards when turned on, and blocks the current when turned off. The switching elements SW33a and SW34a are insulated gate bipolar transistors (IGBT), for example.

The rectifier circuit 304 may use any other switching element by free choice, in place of the MOSFET-based or IGBT-based switching elements.

Fourth Embodiment

The third embodiment has explained the power converter apparatus including the plurality of switching elements configured as the full-bridge circuit on the primary side. A fourth embodiment will explain a power converter apparatus including a plurality of switching elements configured as a half-bridge circuit on a primary side.

Figure 20:
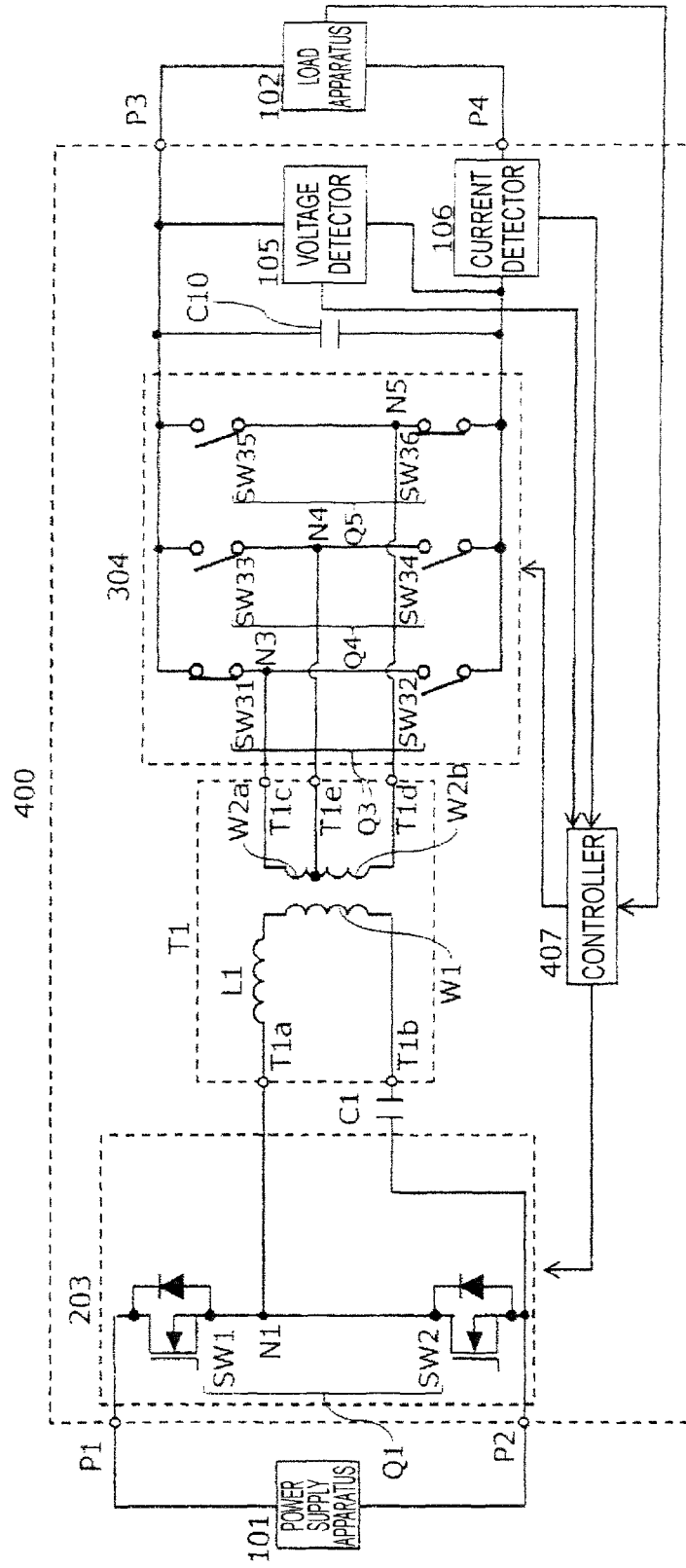
FIG. 20 is a block diagram illustrating a configuration of a power converter apparatus 400 according to a fourth embodiment.

FIG. 20 is a block diagram illustrating a configuration of a power converter apparatus 400 of the fourth embodiment. The power converter apparatus 400 includes a switching element group 203 and a controller 407, in place of the switching element group 103 and the controller 307 of FIG. 13. The power converter apparatus 400 has such a configuration that the switching elements SW3 and SW4 are omitted from the power converter apparatus 300 of FIG. 13. The terminal T1a of the primary winding of the transformer T1 is connected to the node N1 between the switching elements SW1 and SW2. The terminal T1b of the primary winding of the transformer T1 is connected via the capacitor C1 to the input terminal P2. Also this case is understood as the LLC resonant power converter apparatus similar to the power converter apparatus of the third embodiment, capable of generating the output voltage over a wide voltage range, with higher efficiency than that of the prior art.

Other Modified Embodiments

The respective embodiments of the present disclosure have described the cases where the secondary winding W2 of the transformer T1 includes three terminals T1c to T1d. However, the secondary winding W2 may include four or more terminals, as long as one of a plurality of different winding sections of the secondary winding W2 can be selectively connected to the output circuit.

The third and fourth embodiments of the present disclosure explained the cases where the rectifier circuit 304 includes three leg circuits Q3 to Q5. However, in a case where the secondary winding W2 includes four or more terminals, the rectifier circuit may have four or more leg circuits connected to these terminals, respectively. The rectifier circuit uses two of these leg circuits to connect one of the plurality of different winding sections of the secondary winding to the output circuit, and synchronously rectifies the current generated in one winding section of the secondary winding, and supplies the current to the output circuit.

In the first and second embodiments of the present disclosure, the power control circuit may include a rectifier circuit that performs synchronous rectification by using a plurality of switching elements, in place of the rectifier circuit of diode bridge type.

INDUSTRIAL APPLICABILITY

The power converter apparatus according to the present disclosure is applicable, for example, to an on-vehicle or in-car power converter apparatus used for charging batteries of electric vehicles or hybrid vehicles.

The invention claimed is:

1. A power converter apparatus comprising: first and second input terminals; first and second output terminals; at least one first leg circuit including two switching elements connected in series between the first and the second input terminals; a transformer having a primary winding and a secondary winding; a capacitor; a switch circuit; and an output circuit connected to the first and the second output terminals, wherein the capacitor is connected between one of the at least one first leg circuit and one end of the primary winding, wherein the switch circuit selectively connects one of a plurality of mutually different winding sections of the secondary winding to the output circuit, wherein the transformer includes a leakage inductance inside of the transformer, wherein the secondary winding comprises first and second winding sections having different numbers of turns, wherein the transformer is configured so that, the leakage inductance of the transformer when the first winding section is connected to the output circuit, is different from the leakage inductance of the transformer when the second winding section is connected to the output circuit, wherein the secondary winding comprises a first terminal, a second terminal, and a third terminal provided between the first and the second terminals, wherein the switch circuit connects the first winding section, which is a section of the secondary winding between the first and the second terminals, to the output circuit, and connects the second winding section, which is a section of the secondary winding between the second and the third terminals, to the output circuit, and wherein the transformer is configured so that, a distance from the primary winding to the section of the secondary winding between the second and the third terminals, is larger than a distance from the primary winding to the section of the secondary winding between the first and the third terminals; wherein the transformer is configured so that, the primary winding, the section of the secondary winding between the first and the third terminals, and the section of the secondary winding between the second and the third terminals are wound at different positions along a longitudinal direction of a predetermined axis.

2. The power converter apparatus as claimed in claim 1, wherein the transformer is configured so that, the primary winding, the section of the secondary winding between the first and the third terminals, and the section of the secondary winding between the second and the third terminals, are wound at positions different distances away from a predetermined axis.

3. The power converter apparatus as claimed in claim 1, wherein the transformer is configured so that, the number of turns of the first winding section is larger than the number of turns of the second winding section, and so that, the leakage inductance of the transformer when the second winding section is connected to the output circuit, is larger than the leakage inductance of the transformer when the first winding section is connected to the output circuit.

4. The power converter apparatus as claimed in claim 3, further comprising:
a voltage detector that detects an output voltage outputted from the first and second output terminals;
a current detector that detects an output current outputted from the first and the second output terminals; and
a controller configured to control each of the switching elements of the at least one first leg circuit, and to control the switch circuit, based on the output voltage and the output current.

5. The power converter apparatus as claimed in claim 4, wherein the controller is configured to control the switch circuit to connect the first winding section to the output circuit when the output voltage is equal to or larger than a predetermined threshold value, and to connect the second winding section to the output circuit when the output voltage is smaller than the threshold value.

6. The power converter apparatus as claimed in claim 4, wherein the controller is configured to determine a switching frequency for operating the respective switching elements of the at least one first leg circuit, based on:
a capacitance and an inductance contained in the path leading from the first input terminal, via the respective switching elements of the respective first leg circuits turned on by the controller, and the primary winding of the transformer, to the second input terminal;
the output voltage and the output current; and
a target voltage outputted from the first and the second output terminals.

7. The power converter apparatus as claimed in claim 1, wherein the output circuit includes a rectifier circuit.

8. The power converter apparatus as claimed in claim 1, wherein the secondary winding has at least three terminals different from each other;
wherein the switch circuit includes at least three second leg circuits, each having two switching elements connected in series to each other, and each connected to one of the at least three terminals of the secondary winding; and
wherein the switch circuit connects one of the plurality of mutually different winding sections of the secondary winding to the output circuit, by using two of the at least three second leg circuits, and synchronously rectifies a current generated in one winding section of the secondary winding, and supplies the current to the output circuit.

* * * * *